United States Patent
Kim

(10) Patent No.: US 11,097,761 B2
(45) Date of Patent: Aug. 24, 2021

(54) WAGON HAVING IMPROVED CONVENIENCE OF USE

(71) Applicant: BRAN-NEW INTERNATIONAL, Seoul (KR)

(72) Inventor: Mijin Kim, Bucheon-Si (KR)

(73) Assignee: BRAN-NEW INTERNATIONAL, Seoul (KR)

( * ) Notice: Subject to any disclaimer, the term of this patent is extended or adjusted under 35 U.S.C. 154(b) by 0 days.

(21) Appl. No.: 17/052,396

(22) PCT Filed: Nov. 19, 2019

(86) PCT No.: PCT/KR2019/015791
§ 371 (c)(1),
(2) Date: Nov. 2, 2020

(87) PCT Pub. No.: WO2020/105997
PCT Pub. Date: May 28, 2020

(65) Prior Publication Data
US 2021/0229728 A1    Jul. 29, 2021

(30) Foreign Application Priority Data
Nov. 23, 2018  (KR) .......................... 10-2018-0146478

(51) Int. Cl.
*B62B 3/02*      (2006.01)
*B62B 7/10*      (2006.01)
(Continued)

(52) U.S. Cl.
CPC .............. *B62B 7/105* (2013.01); *B62B 3/007* (2013.01); *B62B 3/022* (2013.01); *B62B 7/064* (2013.01); *B62B 9/142* (2013.01); *B62B 9/26* (2013.01)

(58) Field of Classification Search
CPC .. B62B 3/02; B62B 3/022; B62B 7/06; B62B 7/08; B62B 7/10; B62B 7/105; B62B 7/006; B62B 7/14; B62B 9/26
See application file for complete search history.

(56) References Cited

U.S. PATENT DOCUMENTS 9,108,656 B1 *  8/2015  Nolan ...................... B62B 3/007
9,139,215 B2 *  9/2015  Zhu .......................... B62B 7/145
(Continued)

FOREIGN PATENT DOCUMENTS

KR  10-1719132 B1  3/2017
KR  20-0483642 Y1  6/2017
(Continued)

OTHER PUBLICATIONS

Baby Trend Expedition 2-in-1 Stroller Wagon Plus; webpage retrieved May 21, 2021; https://www.amazon.com/Baby-Trend-Expedition-Stroller-Marine/dp/B085291NZJ/ref=sr_1_19?dchild=1&keywords=car%2Bstroller%2Bwagon&qid=1621626927&sr=8-19&th=1.*

*Primary Examiner* — Emma K Frick
(74) *Attorney, Agent, or Firm* — Novick, Kim & Lee, PLLC; Jae Youn Kim

(57) ABSTRACT

Disclosed is a wagon having improved convenience of use, wherein the wagon includes a main frame, a seat frame, a canopy frame, and a wheel assembly, wherein a foldable structure of each frame is conveniently manufactured such that the wagon can be unfolded and folded within a short time when the wagon in a stored state is installed, whereby portability and mobility of the wagon are improved, wherein the overall frame is easily folded and unfolded, whereby it is possible to conveniently use the wagon, wherein attachment and detachment of the canopy and the driving wheels are easy, whereby carrying and storage of the wagon are easy, and wherein the wagon is easily folded and unfolded (Continued)

without separation of the seat frame and the canopy, whereby it is possible for everyone to easily install and store the wagon.

4 Claims, 19 Drawing Sheets

(51) Int. Cl.
  *B62B 9/14* (2006.01)
  *B62B 7/06* (2006.01)
  *B62B 9/26* (2006.01)
  *B62B 3/00* (2006.01)

(56) References Cited

U.S. PATENT DOCUMENTS

| | | | |
|---|---|---|---|
| 9,221,487 B2 * | 12/2015 | Doucette | B62B 7/123 |
| 9,302,694 B2 * | 4/2016 | Velichko | B62B 7/12 |
| 9,469,324 B2 * | 10/2016 | Bowman | B62B 3/007 |
| 10,053,131 B2 * | 8/2018 | Ruggiero | B62B 7/064 |
| 10,077,063 B2 * | 9/2018 | Haut | B62B 9/20 |
| 10,239,550 B2 * | 3/2019 | Ruggiero | B62B 9/245 |
| 10,343,704 B2 * | 7/2019 | Oakes | B62B 7/062 |
| 10,517,265 B2 * | 12/2019 | Lin | B62B 3/02 |
| 10,850,760 B2 * | 12/2020 | Shapiro | B62B 3/022 |
| 10,913,478 B1 * | 2/2021 | Zhou | B62B 7/10 |
| 10,913,481 B2 * | 2/2021 | Kim | B62B 9/14 |
| 10,988,153 B1 * | 4/2021 | Horowitz | B62B 3/02 |
| 11,001,289 B2 * | 5/2021 | Gibson | B62B 7/008 |
| 2020/0385043 A1 * | 12/2020 | Young | B62B 7/10 |
| 2021/0022314 A1 * | 1/2021 | Xiang | B62B 7/062 |

FOREIGN PATENT DOCUMENTS

| | | |
|---|---|---|
| KR | 10-1834474 B1 | 3/2018 |
| KR | 10-1894460 B1 | 9/2018 |
| KR | 10-1995268 B1 | 7/2019 |

* cited by examiner

WAGON HAVING IMPROVED CONVENIENCE OF USE

TECHNICAL FIELD

The present invention relates to a wagon having improved convenience of use, wherein a foldable structure of each frame is conveniently manufactured such that the wagon can be unfolded and folded within a short time when the wagon in a stored state is installed, whereby portability and mobility of the wagon can be improved, wherein the overall frame is easily folded and unfolded, whereby it is possible to conveniently use the wagon, and wherein the wagon is easily folded and unfolded without separation of a seat frame and a canopy, whereby it is possible for everyone to easily install and store the wagon.

BACKGROUND ART

Wagons used for outings and walking in homes having children, such as infants and babies, have been developed and used in various forms.

A conventional wagon is configured such that an unlocking button is pushed and then a frame is rotated in order to unfold a wagon frame stored in a folded state. However, a minimum of three, four, or more operations must be performed due to a structure of a main frame. In addition, a separate canopy or a separate storage basket must be further installed. As a result, a caregiver has difficulty, whereby it is difficult to rapidly install the wagon, and therefore portability and mobility of the wagon are deteriorated. Even when the wagon is folded after being used, on the other hand, it is not easy to fold the wagon. Consequently, caregivers or acquaintances who do not know the wagon well have difficulty in installation and storage of the wagon.

Also, in the conventional wagon, the coupling structures of wheels and the canopy are complicated, whereby the caregiver has difficulty at the time of detachment and coupling of the wheels and the canopy. In particular, the wagon is configured such that the wagon frame is folded only in the state in which the canopy is detached. As a result, it is necessary to attach and detach the canopy whenever the wagon is used and stored, which is troublesome.

DISCLOSURE

Technical Problem

The present invention has been made in view of the above problems, and it is an object of the present invention to provide a wagon having improved convenience of use, wherein a foldable structure of each frame is conveniently manufactured such that the wagon can be unfolded and folded within a short time when the wagon in a stored state is installed, whereby portability and mobility of the wagon are improved, wherein the overall frame is easily folded and unfolded, whereby it is possible to conveniently use the wagon, wherein attachment and detachment of a canopy and driving wheels are easy, whereby carrying and storage of the wagon are easy, and wherein the wagon is easily folded and unfolded without separation of a seat frame and a canopy, whereby it is possible for everyone to easily install and store the wagon.

Technical Solution

In accordance with the present invention, the above object can be accomplished by the provision of a wagon having improved convenience of use, the wagon including:

a main frame configured to have a structure in which each side of the main frame is formed in a "^" shape to completely support a main body of the wagon and the main frame is configured to be folded or unfolded at intersection portions thereof through hinge structures such that the form of the main frame is variable;

a seat frame, which is a rectangular frame coupled to one side of the inner upper end of the main frame in a leftward-rightward direction, the seat frame being configured to support a wagon seat;

a canopy frame including a plurality of "["-shaped frames configured to be rotated upwards and downwards about a plurality of rotary shafts formed in left-right symmetry in order to open and close the upper end of the infant wagon; and a wheel assembly including front wheel driving assemblies (410) coupled to left and right sides of the front lower end of the main frame in a symmetrical fashion and a rear wheel driving assembly coupled to left and right sides of the rear of the main frame, the wheel assembly being configured to drive the infant wagon while supporting the infant wagon.

Advantageous Effects

As is apparent from the above description, a wagon according to the present invention has effects in that a foldable structure of each frame is conveniently manufactured such that the wagon can be unfolded and folded within a short time when the wagon in a stored state is installed, whereby portability and mobility of the wagon are improved, wherein the overall frame is easily folded and unfolded, whereby it is possible to conveniently use the wagon, wherein attachment and detachment of a canopy and driving wheels are easy, whereby carrying and storage of the wagon are easy, and wherein the wagon is easily folded and unfolded without separation of a seat frame and a canopy, whereby it is possible for everyone to easily install and store the wagon.

BEST MODE

Figure 1:
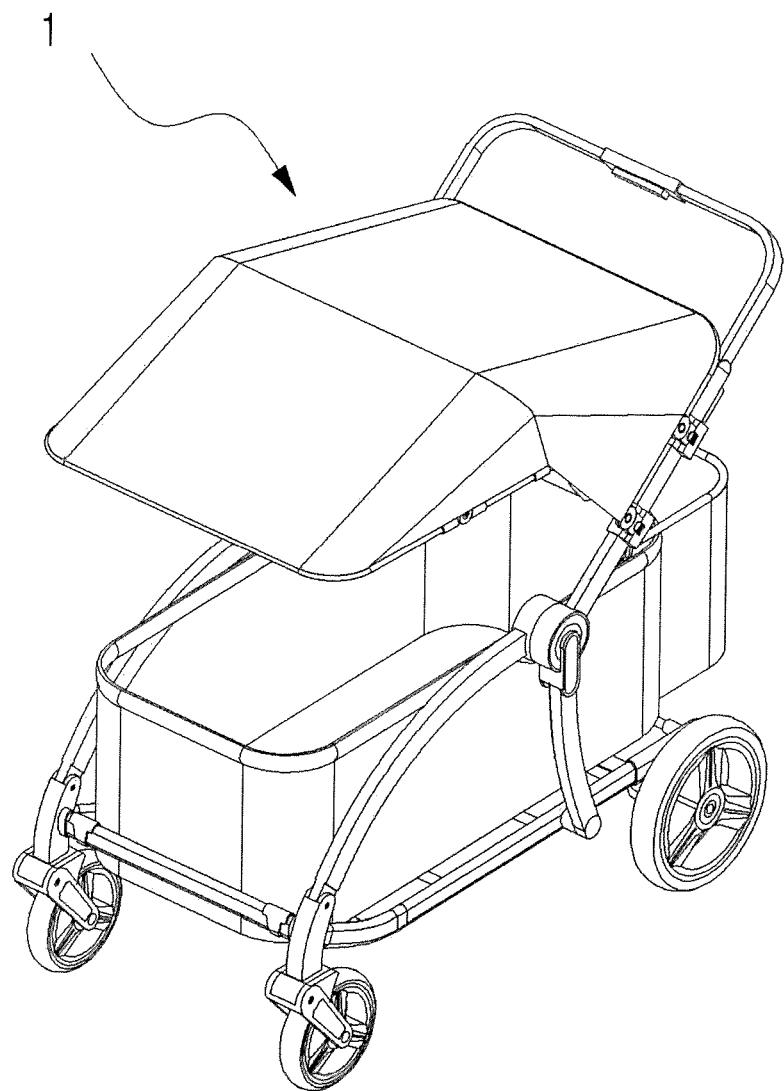
FIG. 1 is a perspective view showing the overall shape of a wagon having improved convenience of use according to the present invention at which a seat is installed.
Figure 2:
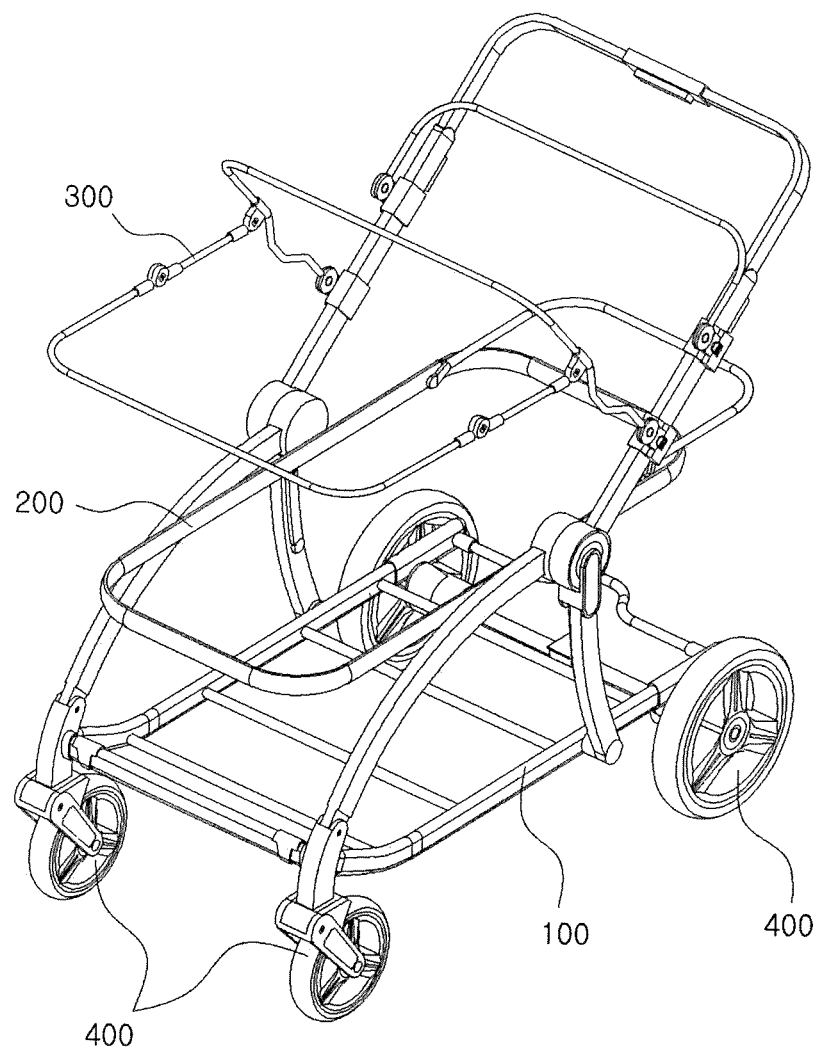
FIG. 2 is a perspective view showing the overall shape and the structural elements of a wagon frame of the wagon having improved convenience of use according to the present invention.
Figure 3:
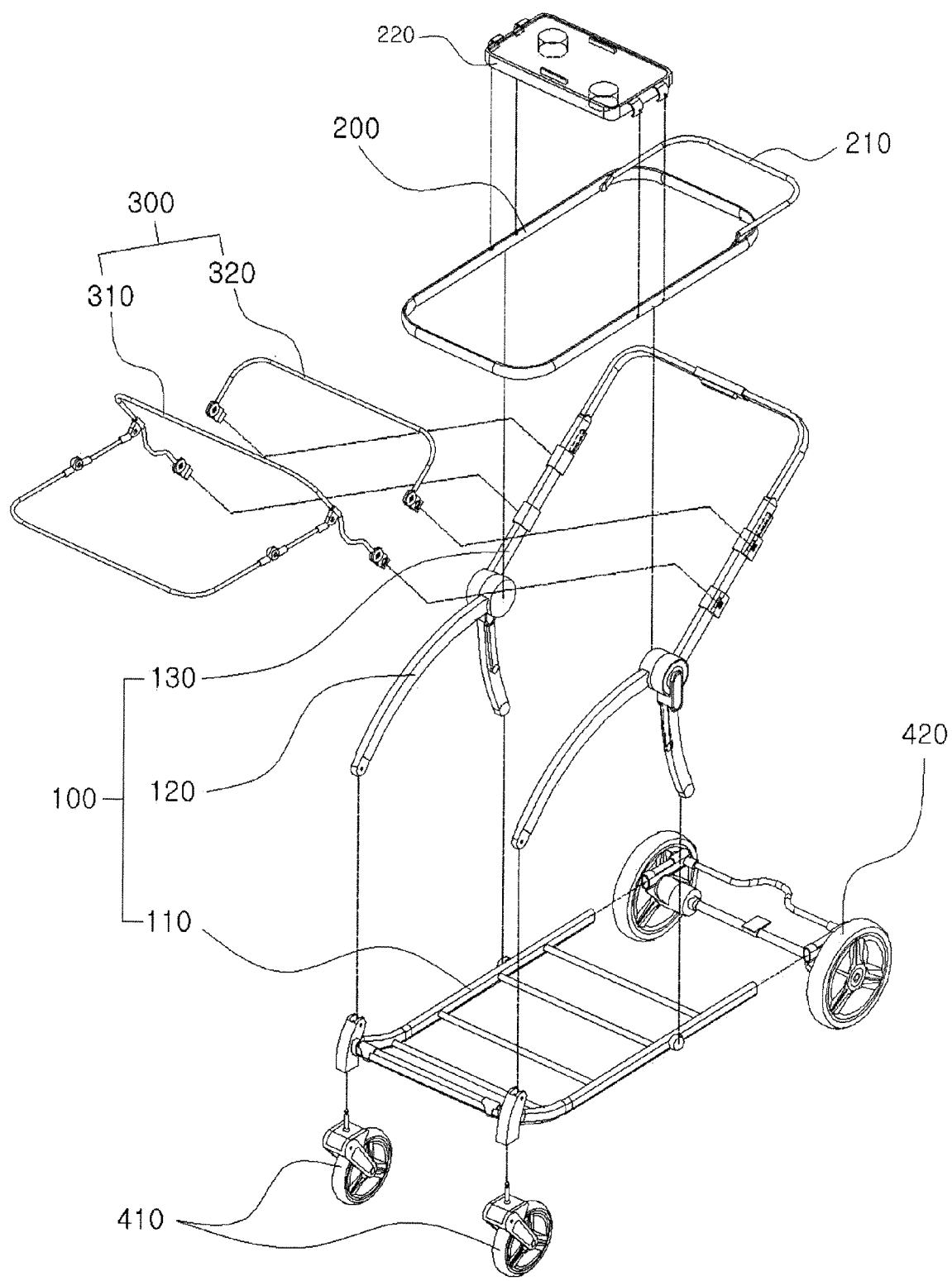
FIG. 3 is an exploded perspective view showing the structural elements of the wagon having improved convenience of use according to the present invention.
Figure 4:
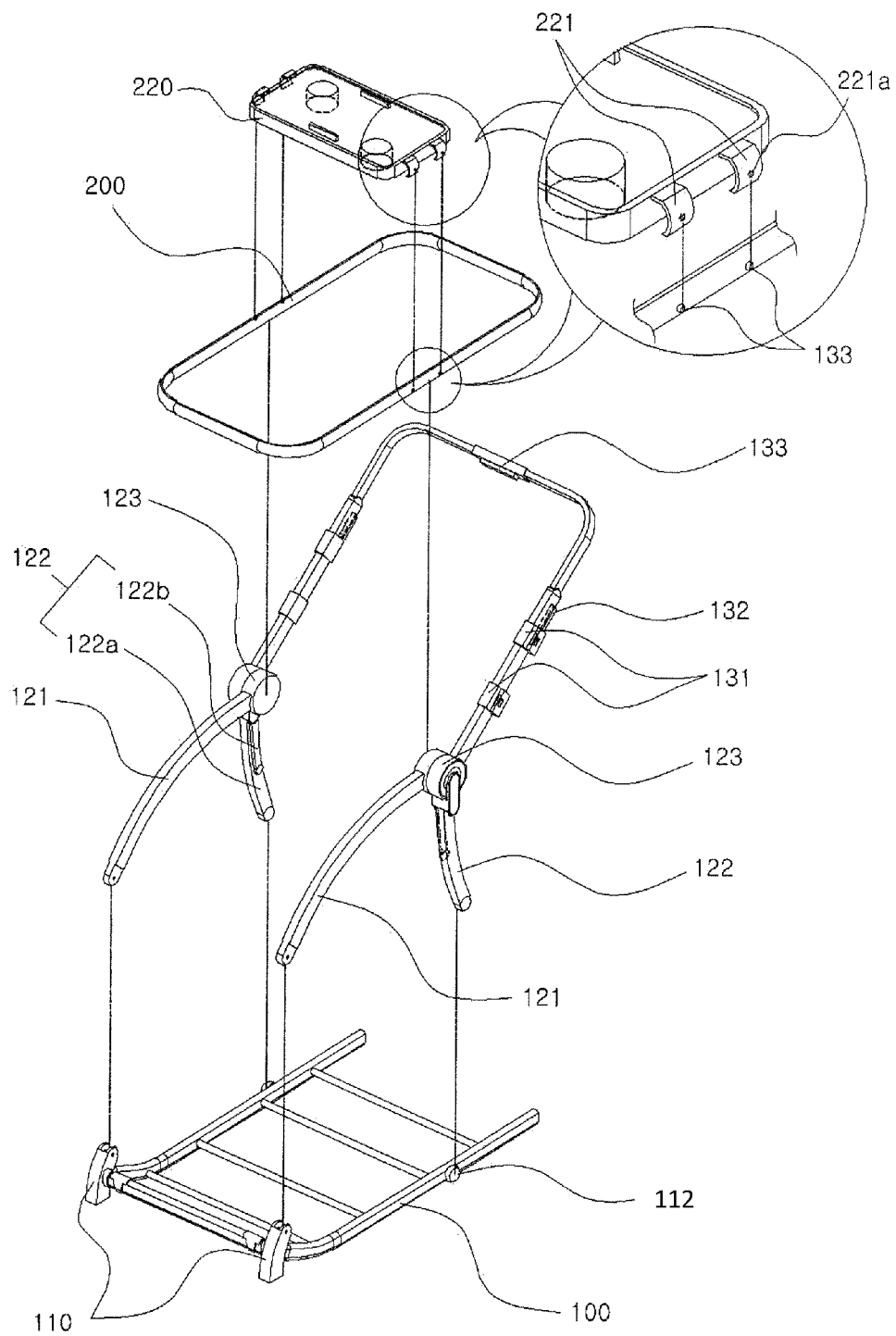
FIG. 4 is an exploded perspective view showing the structural elements of a main frame and a seat frame according to the present invention.

The present invention provides a wagon having improved convenience of use, the wagon including: a main frame (100) configured to have a structure in which each side of the main frame is formed in a "^" shape to completely support a main body of the wagon and the main frame can be folded or unfolded at intersection portions thereof through hinge structures such that the form of the main frame is variable.

The main frame includes a bottom support frame (110), which is a trapezoidal frame which is laid horizontally and a front side of which is curved upwards, front wheel coupling portions being formed at left and right front ends of the bottom support frame, rotary coupling shafts being formed at middles of left and right sides of the bottom support frame so as to be axially coupled to a side support frame.

The main frame further includes a side support frame (120), which is a frame which is formed in left-right symmetry and each side of which is formed in a "^" shape, front and rear lower ends of the side support frame being axially coupled to the bottom support frame via rotary coupling shafts, rotary shaft frames, provided at intersection portions located at an upper end of the side support frame, being formed so as to have hinge structures in order to support sides of a wagon frame.

The main frame further includes a handle frame (130), which is a "["-shaped frame inserted into a hollow outer frame so as to be fixed in the state in which the length thereof is variable, the rotary shaft frames of the side support frame being coupled to left and right lower ends of the handle frame.

The side support frame (120) includes first side frames (121), each of which is a curved frame located at the front of the "^" shape, front lower ends of the first side frames being coupled to upper end rotary shafts of the front wheel coupling portions of the bottom support frame, rear upper ends of the first side frames being coupled to fixed shaft housings of the rotary shaft frames.

The side support frame further includes second side frames (122), each of which is a curved frame having a dual structure located at the rear of the "^" shape, lower ends of the second side frames being coupled to the rotary coupling shafts of the bottom support frame, each of the second side frames including a second outer frame (122a), the middle of which is coupled to a second inner frame via a hinge structure, and a second inner frame (122b), a lower end of which is coupled to an inner middle of the second outer frame via a hinge structure and an upper end of which is coupled to a corresponding one of rotary shaft housings of the rotary shaft frames.

The side support frame further includes rotary shaft frames (123), each of which is a frame having a double cylindrical structure that is erected laterally, each of the rotary shaft frames being formed at a position at which an upper end of a corresponding one of the first side frames and an upper end of a corresponding one of the second side frames intersect each other, the rotary shaft frame being rotated through a hinge structure, the rotary shaft frames being coupled to a seat frame inwards in order to fix the seat frame.

The side support frame further includes a seat frame (200), which is a rectangular frame coupled to one side of an inner upper end of the main frame in a leftward-rightward direction, the seat frame being configured to support a wagon seat (201).

The side support frame further includes a canopy frame (300) including a plurality of "["-shaped frames configured to be rotated upwards and downwards about a plurality of rotary shafts formed in left-right symmetry in order to open and close an upper end of the infant wagon.

The side support frame further includes a wheel assembly (400) including front wheel driving assemblies (410) coupled to left and right sides of a front lower end of the main frame in a symmetrical fashion and a rear wheel driving assembly (420) coupled to left and right sides of the rear of the main frame, the wheel assembly being configured to drive the infant wagon while supporting the infant wagon.

Further, each of the rotary shaft frames (123) includes: a rotary shaft housing (123a), which is an outer frame of the cylindrical structure that is erected laterally, an inner surface of the rotary shaft housing being axially coupled to the fixed shaft housing so as to be rotated in an upward-downward direction.

Each of the rotary shaft frame further includes a coupling pin rotation guide plate (123b), which is a pie-shaped plate empty at one side thereof, a coupling pin movement hole configured to guide fixation and rotation of a coupling pin being formed in the coupling pin rotation guide plate.

Each of the rotary shaft frame further includes a coupling pin movement guide plate (123c), a front part of which is formed in a round shape and a rear part of which is formed in a rectangular shape, the coupling pin movement guide plate being inserted into the coupling pin support frame, the coupling pin movement guide plate being provided in one side of the middle thereof with a coupling pin guide hole, which is a longitudinal hole, in a longitudinal direction.

Each of the rotary shaft frame further includes a coupling pin frame (123d), which is a rectangular frame having a protruding pin (123d-1) protruding therefrom in the leftward-rightward direction, the coupling pin frame being connected to a wire so as to be moved upwards and downwards in the longitudinal direction and to be rotated.

Each of the rotary shaft frame further includes a coupling pin support frame (123e), a front part of which is formed in a cylindrical shape that is erected laterally, the front part of the coupling pin support frame being received in the rotary shaft housing, a rear part of the coupling pin support frame being a rectangular frame, the coupling pin support frame being provided in one side of the inside thereof with a coupling pin frame insertion recess, which is a longitudinal hole, in the longitudinal direction.

Each of the rotary shaft frame further includes a fixed shaft housing (123f), which is an inner frame of the cylindrical structure that is erected laterally, an outer surface of the fixed shaft housing being axially coupled to the rotary shaft housing in order to support axial rotation of the rotary shaft housing.

MODE FOR INVENTION

Hereinafter, preferred embodiments of the present invention will be described with reference to the accompanying drawings.

FIG. 1 is a perspective view showing the overall shape of a wagon having improved convenience of use according to the present invention. The wagon includes a main frame 100, a seat frame 200, a canopy frame 300, and a wheel assembly 400.

First, the main frame 100 according to the present invention will be described.

The main frame 100 is configured to have a structure in which each side of the main frame is formed in a "⌒" shape to completely support a main body of the wagon and the main frame can be folded or unfolded at intersection portions thereof through hinge structures such that the form of the main frame is variable.

The main frame includes a bottom support frame 110, a side support frame 120, and a handle frame 130.

The bottom support frame 110 is a trapezoidal frame which is laid horizontally and the front side of which is curved upwards. Front wheel coupling portions 111 are formed at the left and right front ends of the bottom support frame. Rotary coupling shafts 112 are formed at the middles of the left and right sides of the bottom support frame so as to be axially coupled to the side support frame.

The lower ends of the first side frames 121 are axially coupled to rotary shafts formed at the upper ends of the front wheel coupling portions 111. Front wheel rotation control frames 411 and front wheel rotation fixing pins 412 are inserted into the lower ends of the front wheel coupling portions 111. Front wheel detachment rods 414a are inserted into and fixed to the centers of the lower ends of the front wheel coupling portions 111 in a vertical direction.

The rotary coupling shafts 112 are axially coupled to the lower ends of second outer frames 122a in order to support the second outer frames.

The side support frame 120 is a frame which is formed in left-right symmetry and each side of which is formed in a "⌒" shape. The front and rear lower ends of the side support frame are axially coupled to the bottom support frame via the rotary coupling shafts. Rotary shaft frames, provided at intersection portions located at the upper end of the side support frame, are formed so as to have hinge structures in order to support the sides of a wagon frame. The side support frame includes first side frames 121, second side frames 122, and rotary shaft frames 123.

Each of the first side frames 121 is a curved frame located at the front of the "⌒" shape. The front lower ends of the first side frames are coupled to the upper end rotary shafts of the front wheel coupling portions 111 of the bottom support frame. The rear upper ends of the first side frames are coupled to fixed shaft housings of the rotary shaft frames 123.

Figure 14:
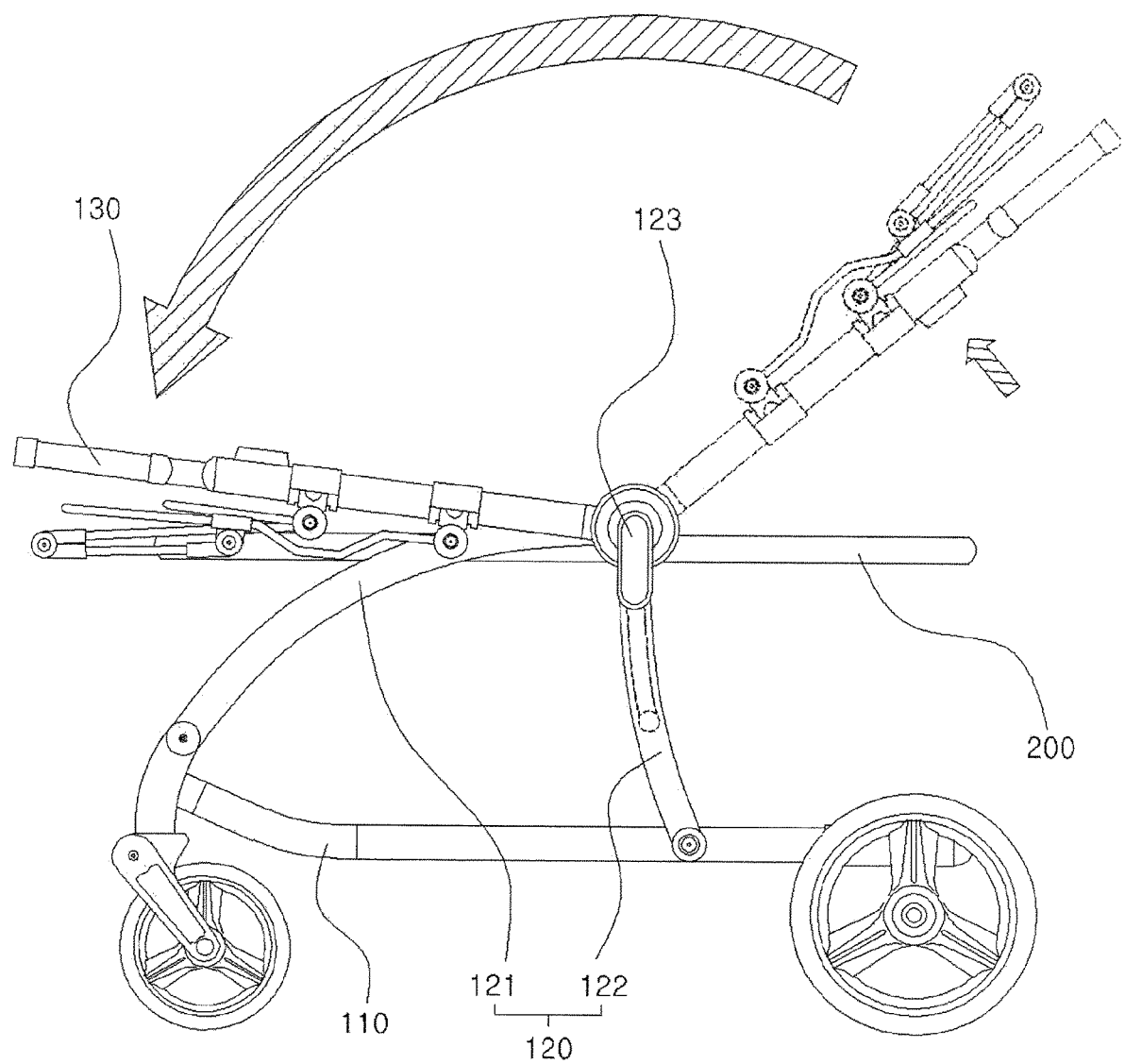
FIG. 14 is a side view showing an embodiment in which the handle frame is rotated forwards by pushing a foldable rotary button according to the present invention.
Figure 15:
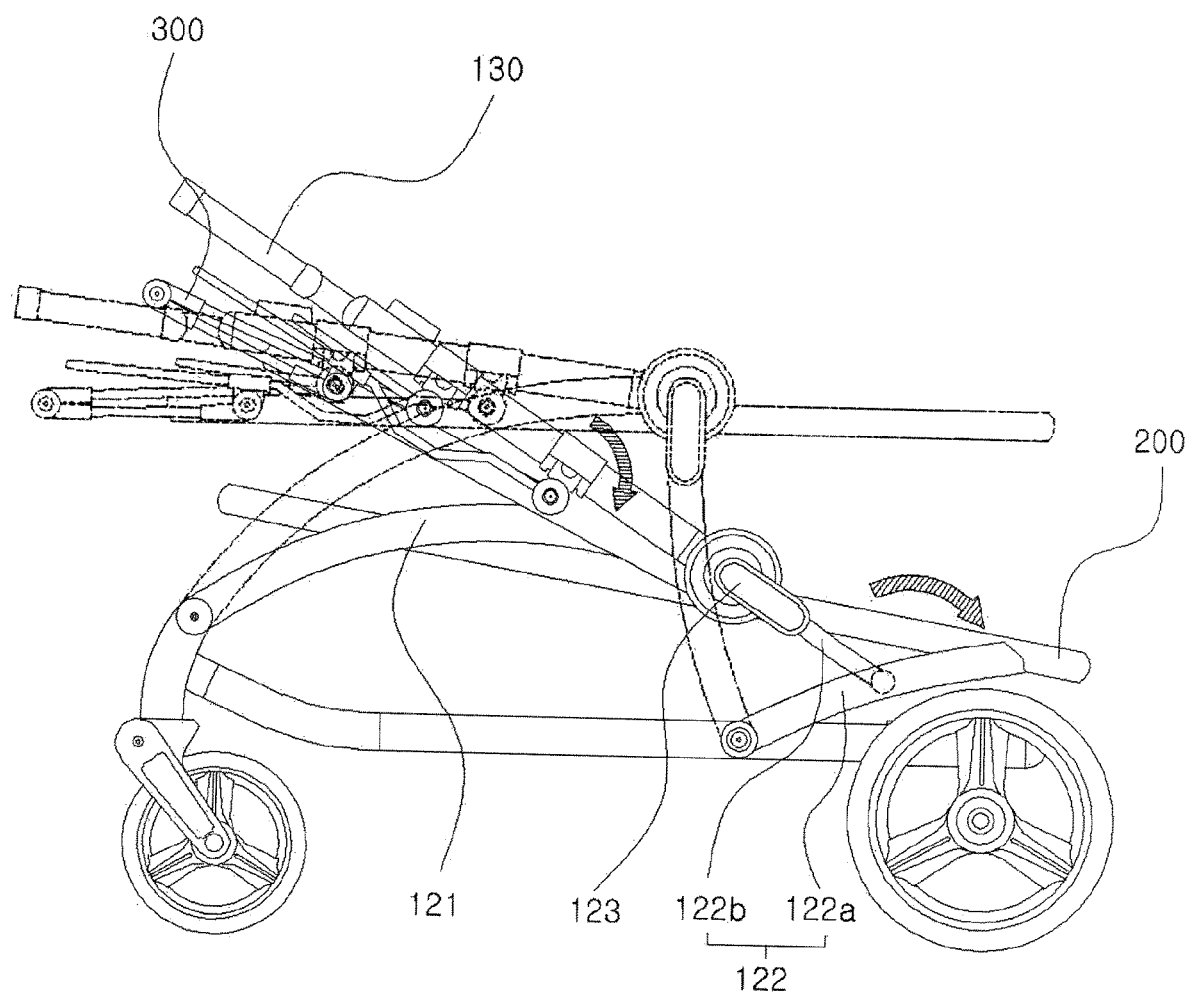
FIG. 15 is a side view showing an embodiment in which a first side frame and a second side frame, which includes a second outer frame and a second inner frame, according to the present invention are rotated in an axial direction and thus are folded.
Figure 16:
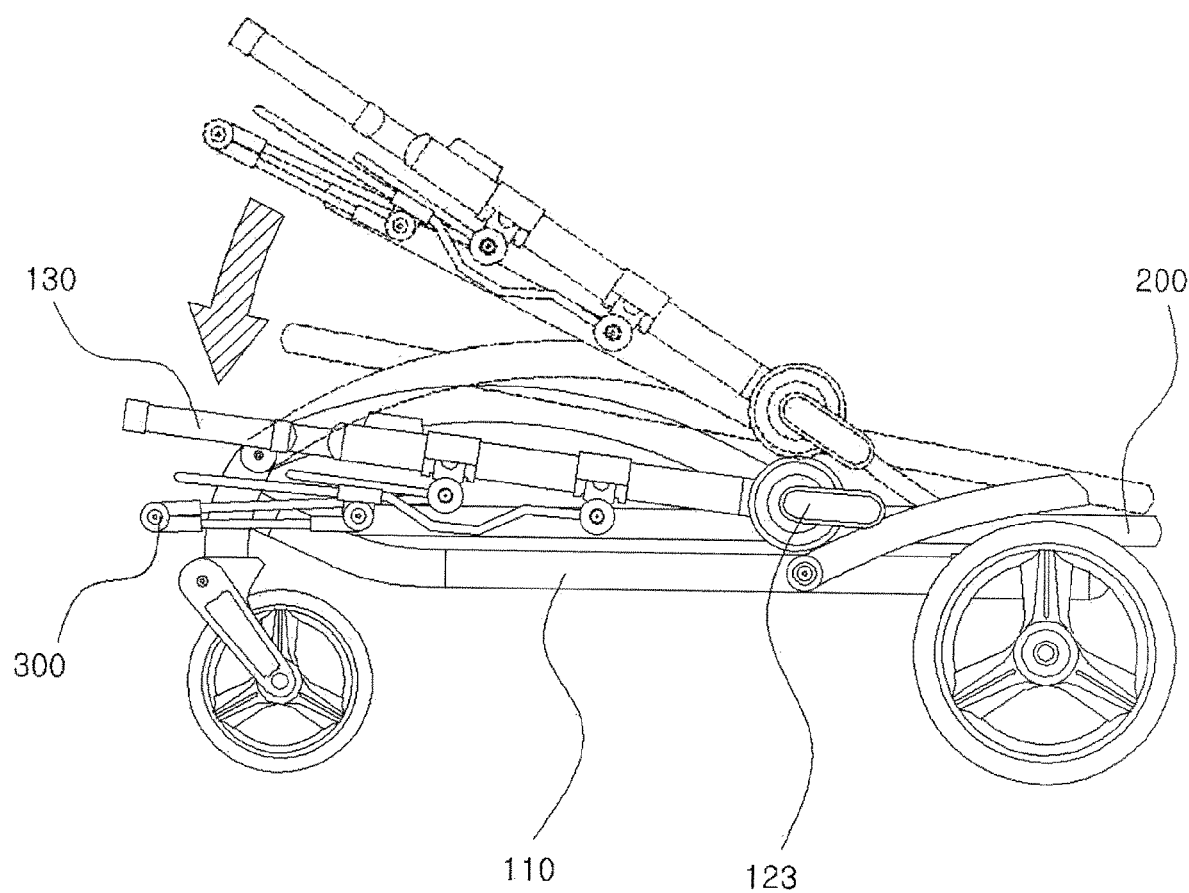
FIG. 16 is a side view showing an embodiment in which the canopy frame brought into tight contact with a length-adjustable handle frame as the result of being folded and the handle frame is rotated downwards and thus is folded in the state of being in tight contact with a bottom support frame such that the volume of the wagon is minimized.
Figure 17:
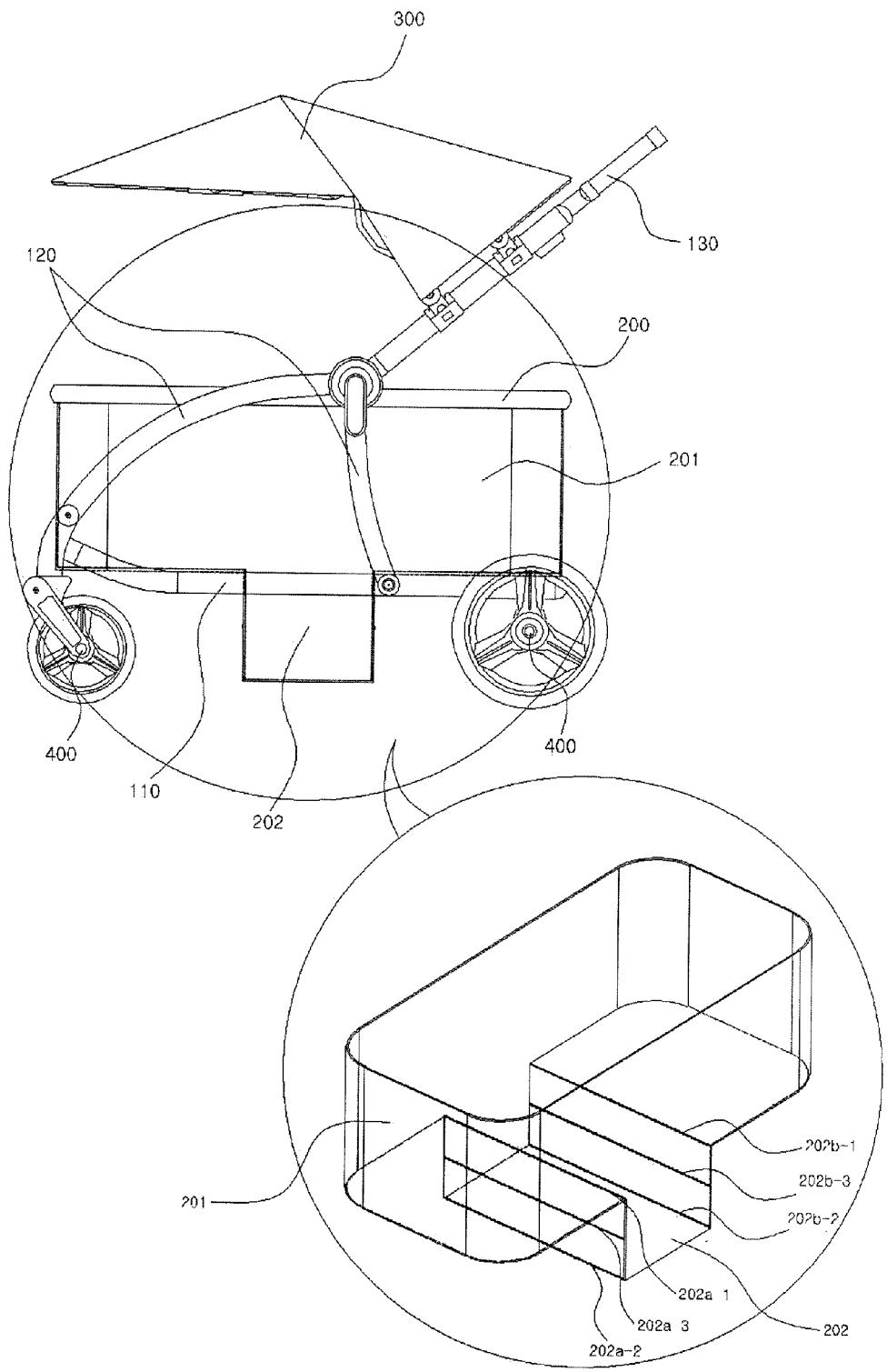
FIG. 17 is a side view showing the overall shape of an infant wagon according to the present invention, with a partial perspective view showing a wagon seat having a seat leg support recess formed in the middle of the inner lower end of the wagon seat as the result of opening a first zipper, a second zipper, and a third zipper.
Figure 18:
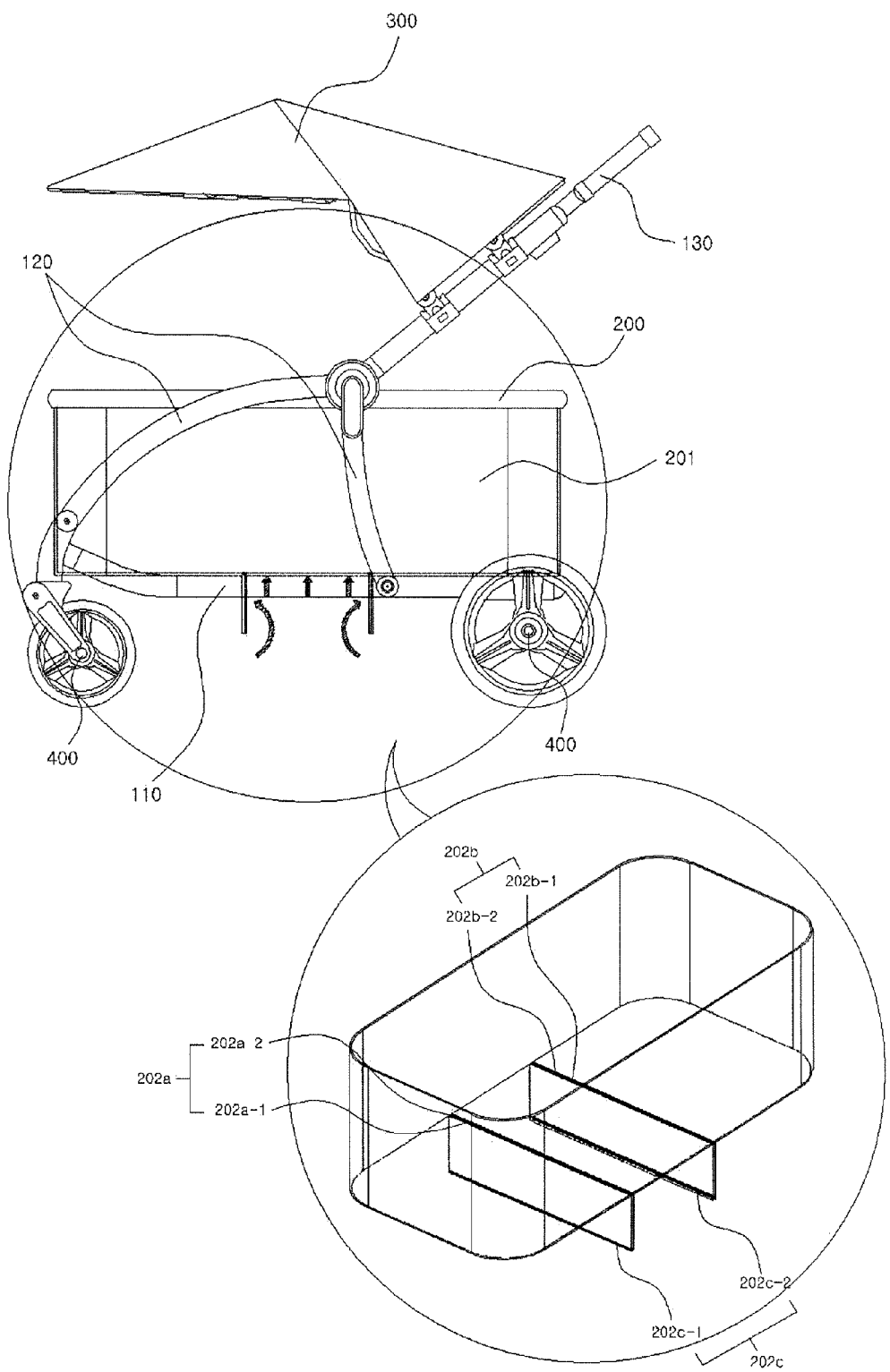
FIG. 18 is a side view showing the overall shape of the infant wagon according to the present invention, with a partial perspective view showing the wagon seat in the state in which the first zipper and the second zipper are closed and the third zipper is open.
Figure 19:
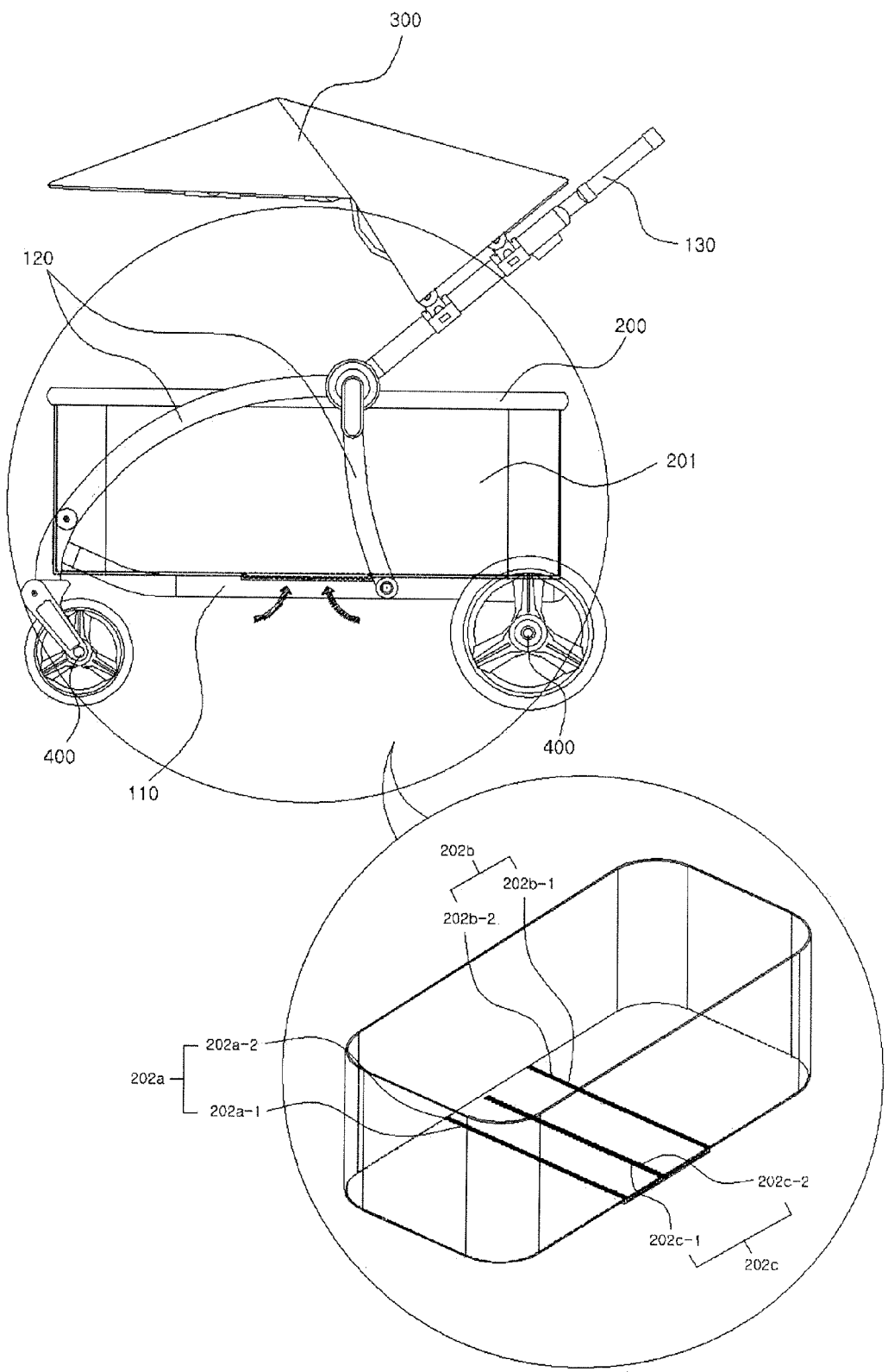
FIG. 19 is a side view showing the overall shape of the infant wagon according to the present invention, with a partial perspective view showing the wagon seat in the state in which the first zipper, the second zipper, and the third zipper are closed such that the inner lower end of the wagon seat is flat.

When the mode of the infant wagon is switched to a folding mode, as shown in FIG. 15, the first side frames are rotated downwards about front rotary shafts to move the rotary shaft frames downwards. When the mode of the infant wagon is switched to a wagon use mode, as shown in FIG. 14, the rotary shaft frames are moved upwards and are then fixed.

Each of the second side frames 122 is a curved frame having a dual structure located at the rear of the "⌒" shape. The lower ends of the second side frames are coupled to the rotary coupling shafts of the bottom support frame. Each of the second side frames 122 includes a second outer frame 122a, the middle of which is coupled to a second inner frame via a hinge structure, and a second inner frame 122b, the lower end of which is coupled to the inner middle of the second outer frame via a hinge structure and the upper end of which is coupled to a corresponding one of rotary shaft housings of the rotary shaft frames.

A frame support rod 122a-1, which is configured to be erected vertically and has a rotation prevention pin 122a-2 protruding inwards therefrom, is formed at the upper end of the second outer frame 122a. The frame support rod is inserted into the lower end of a corresponding one of the rotary shaft housings 123a. The rotation prevention pin 122a-2 is inserted into an inner hole 123a-1 in order to connect the second outer frame and a corresponding one of the rotary shaft housings to each other to thus prevent rotation of the side support frame.

That is, in the infant wagon use mode, the rotation prevention pins are inserted into the inner holes of the rotary shaft housings to prevent rotation of the side support frame, whereby the infant wagon 1 is prevented from being folded during use of the infant wagon. When the mode of the infant wagon is switched to the folding mode, the rotation prevention pins are detached from the inner holes of the rotary shaft housings to separate the second outer frames from the rotary shaft frames such that the infant wagon is folded.

Each of the rotary shaft frames 123 is a frame having a double cylindrical structure that is erected laterally. Each of the rotary shaft frames is formed at a position at which the upper end of a corresponding one of the first side frames and the upper end of a corresponding one of the second side frames intersect each other. The rotary shaft frame is rotated through a hinge structure. The rotary shaft frames are coupled to the seat frame inwards in order to fix the seat frame.

Specifically, each of the rotary shaft frames 123 includes a rotary shaft housing 123a, a coupling pin rotation guide plate 123b, a coupling pin movement guide plate 123c, a coupling pin frame 123d, a coupling pin support frame 123e, and a fixed shaft housing 123f.

The rotary shaft housing 123a is an outer frame of the cylindrical structure that is erected laterally. The inner surface of the rotary shaft housing is axially coupled to the fixed shaft housing so as to be rotated in an upward-downward direction.

An inner hole 123a-1 is formed in one side of the lower end of the rotary shaft housing 123a such that the rotation prevention pin of a corresponding one of the second outer frames is coupled to or separated from the inner hole.

A corresponding one of the second side frames 122 is coupled to the inner lower end of the rotary shaft housing 123a according to the present invention through a hinge structure.

Specifically, when the rotation prevention pin 122a-2 of the frame support rod 122a-1, formed at the upper end of the second side frame 122, is coupled to the inner hole 123a-1 formed in one side of the lower end of the rotary shaft housing 123a, rotation of the second side frame 122 is prevented. When the rotation prevention pin 122a-2 is detached from the inner hole 123a-1, the second side frame 122 is separated from the rotary shaft housing and is rotated.

The coupling pin rotation guide plate 123b is a pie-shaped plate that is empty at one side thereof. A coupling pin movement hole 123b-1 configured to guide fixation and rotation of a coupling pin is formed in the coupling pin rotation guide plate.

Figure 5:
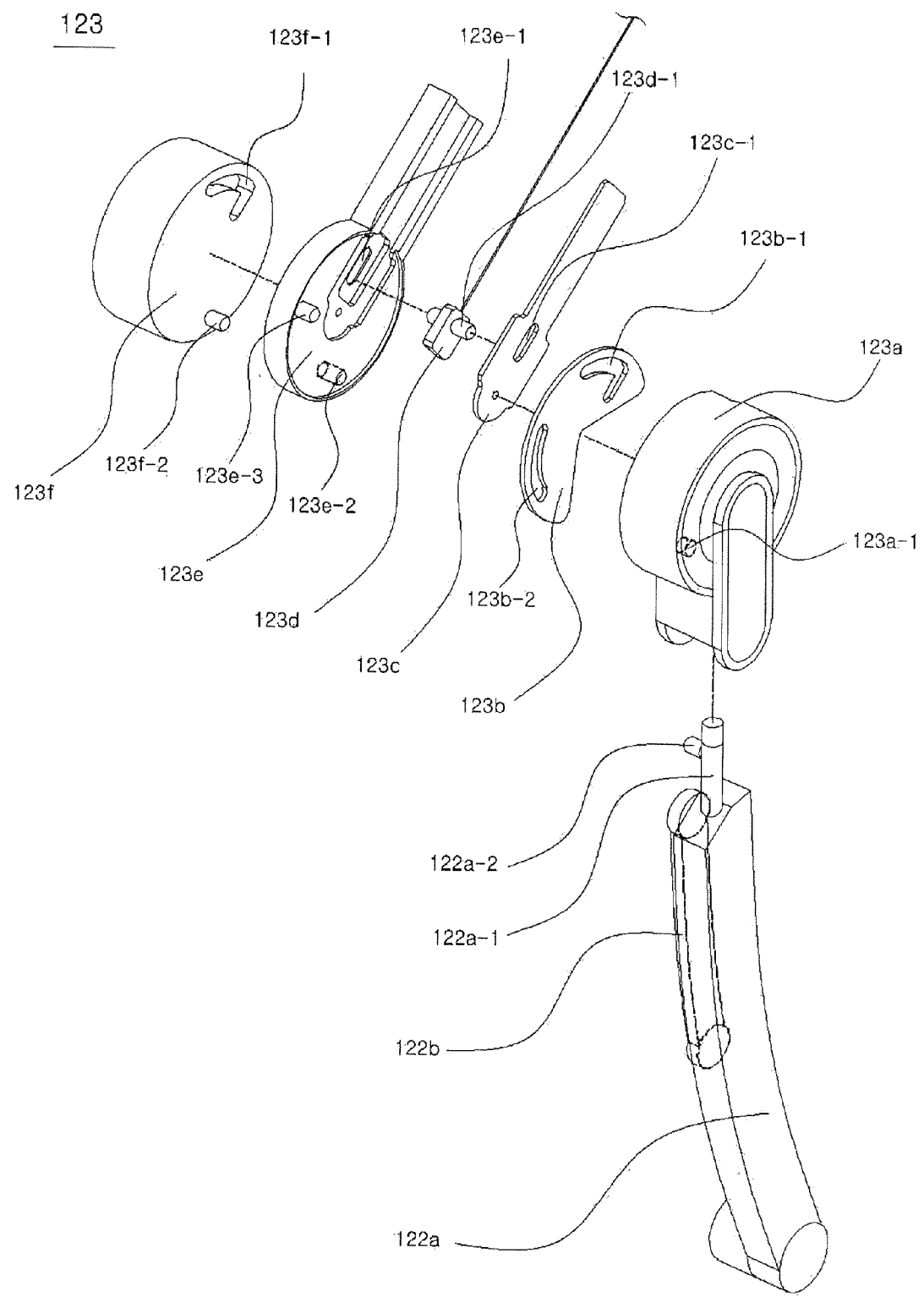
FIG. 5 is an exploded perspective view showing the structural elements of a rotary shaft frame according to the present invention.
Figure 6:
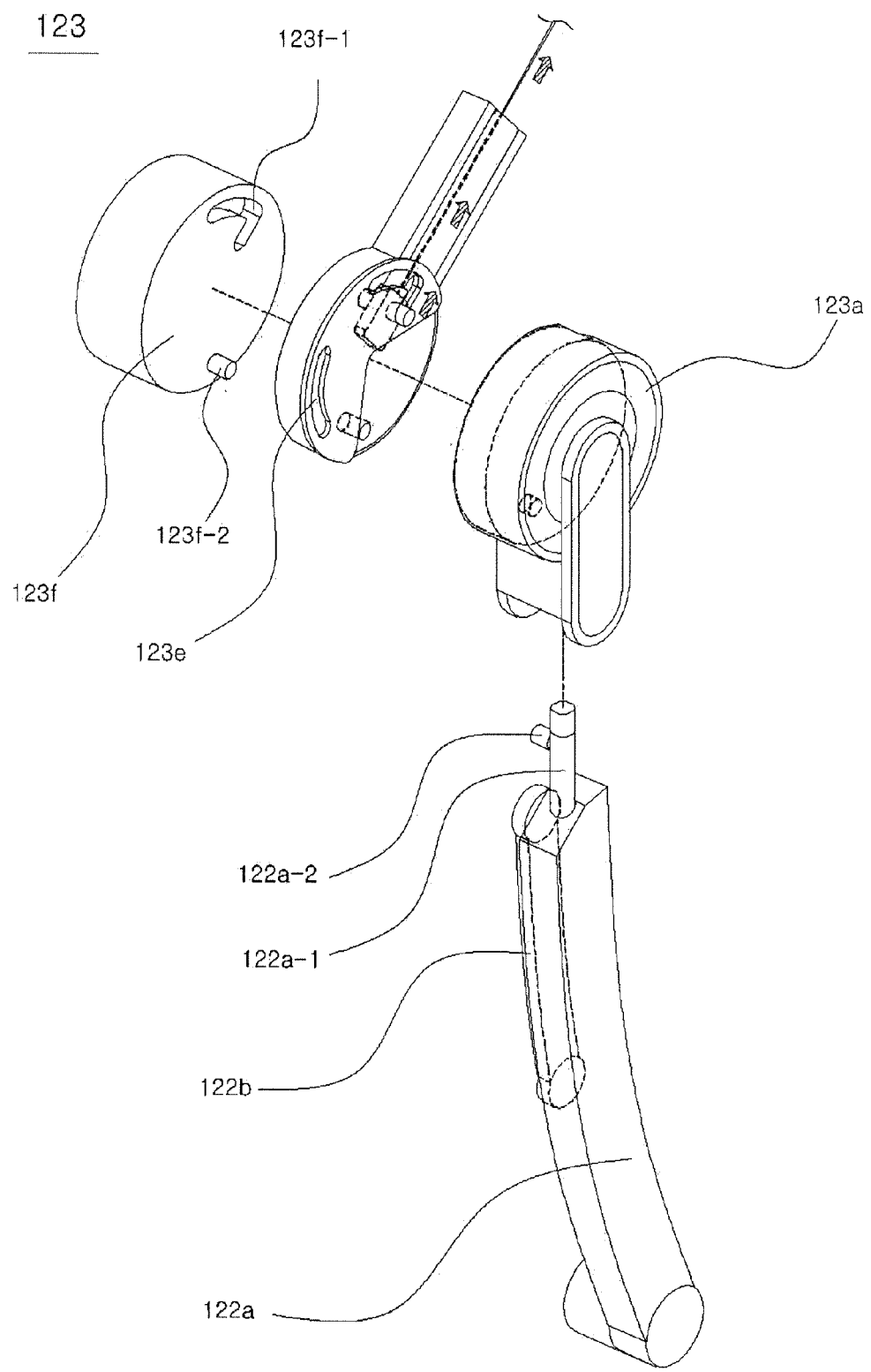
FIG. 6 is an exploded perspective view showing some of the structural elements of the rotary shaft frame according to the present invention.
Figure 7:
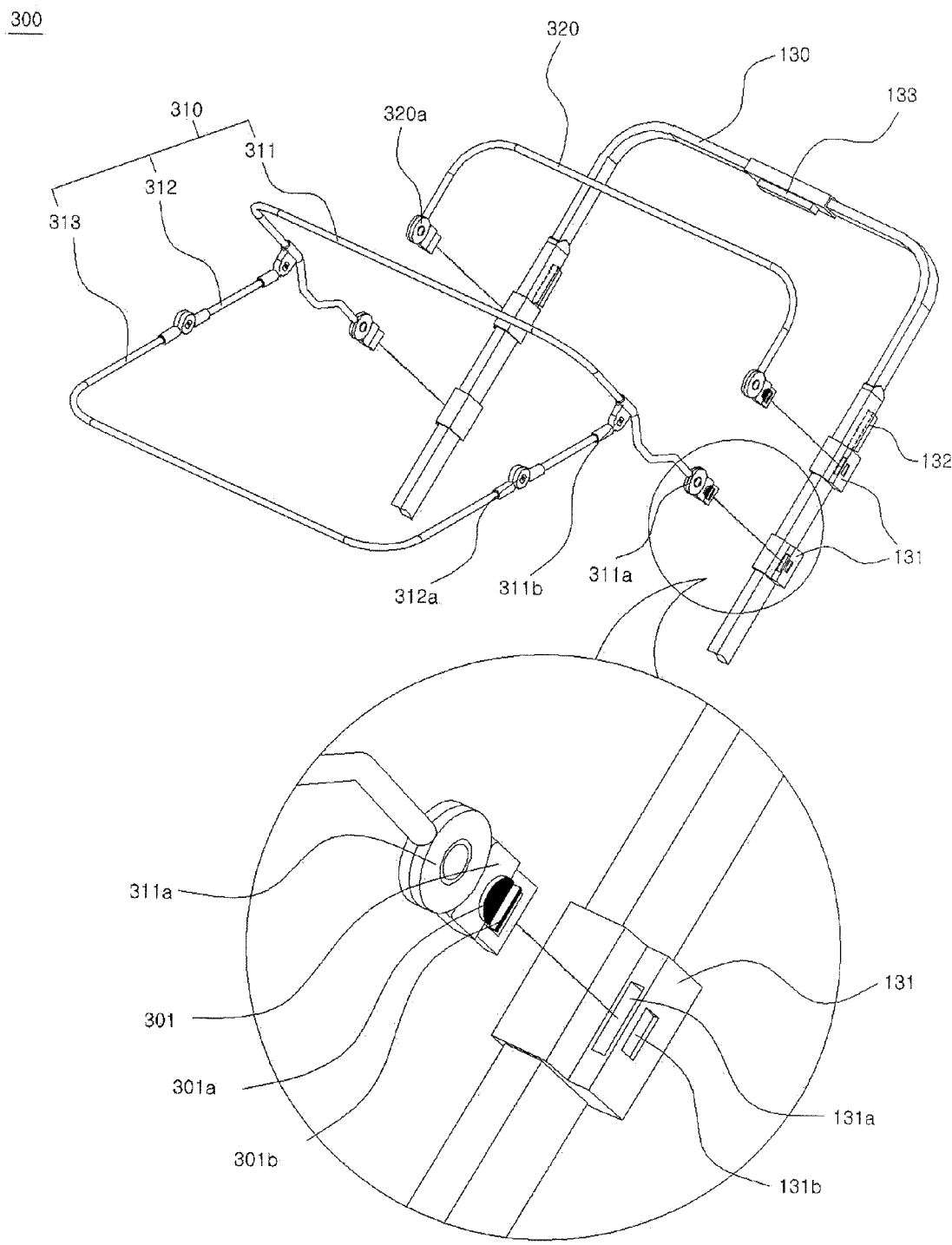
FIG. 7 is a view showing a canopy frame coupled to a canopy coupling bracket of a handle frame according to the present invention, with a partially enlarged view showing a coupling portion.
Figure 8:
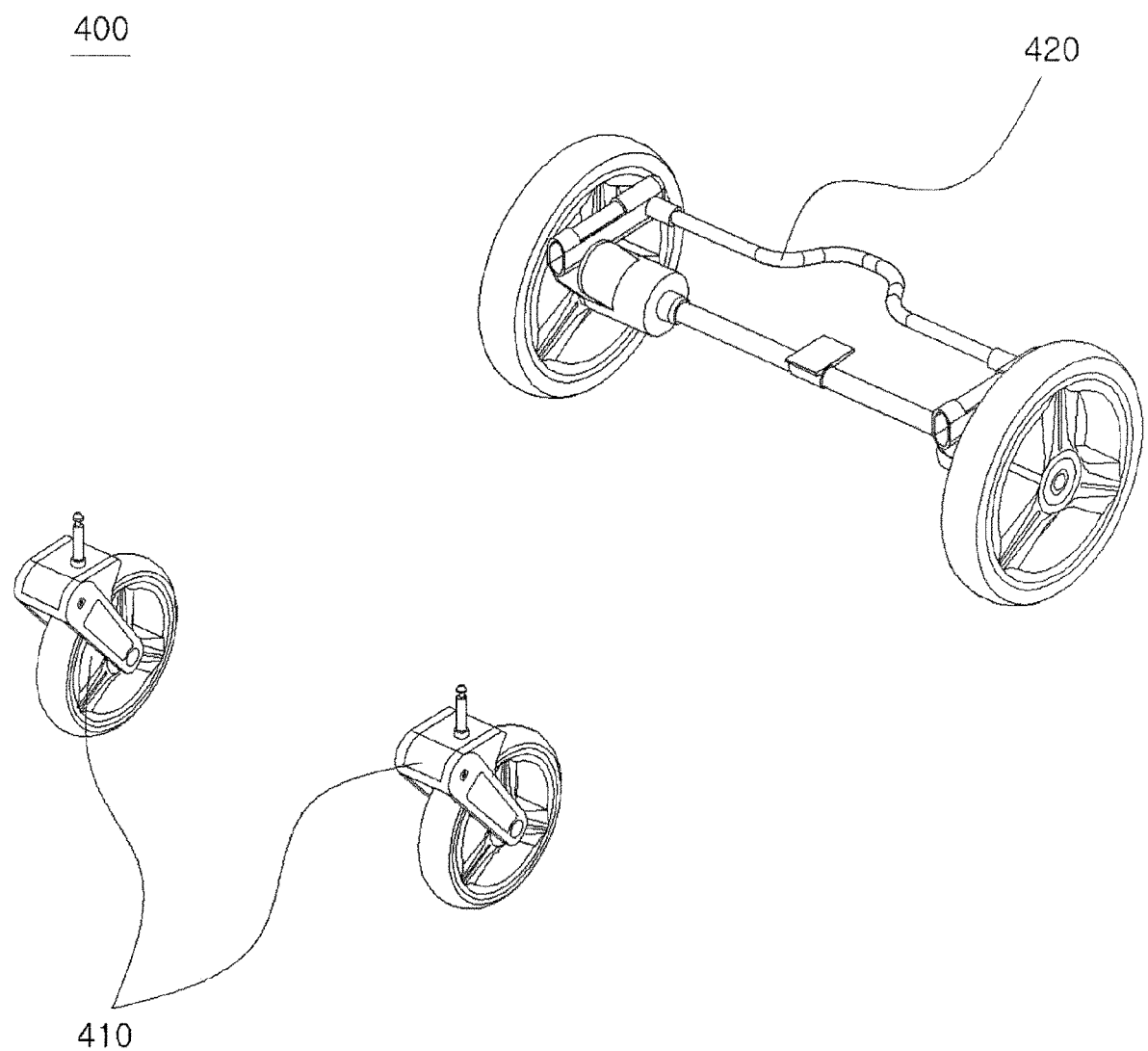
FIG. 8 is a perspective view showing the structural elements of a wheel assembly including a front wheel drive assembly and a rear wheel drive assembly according to the present invention.
Figure 9:
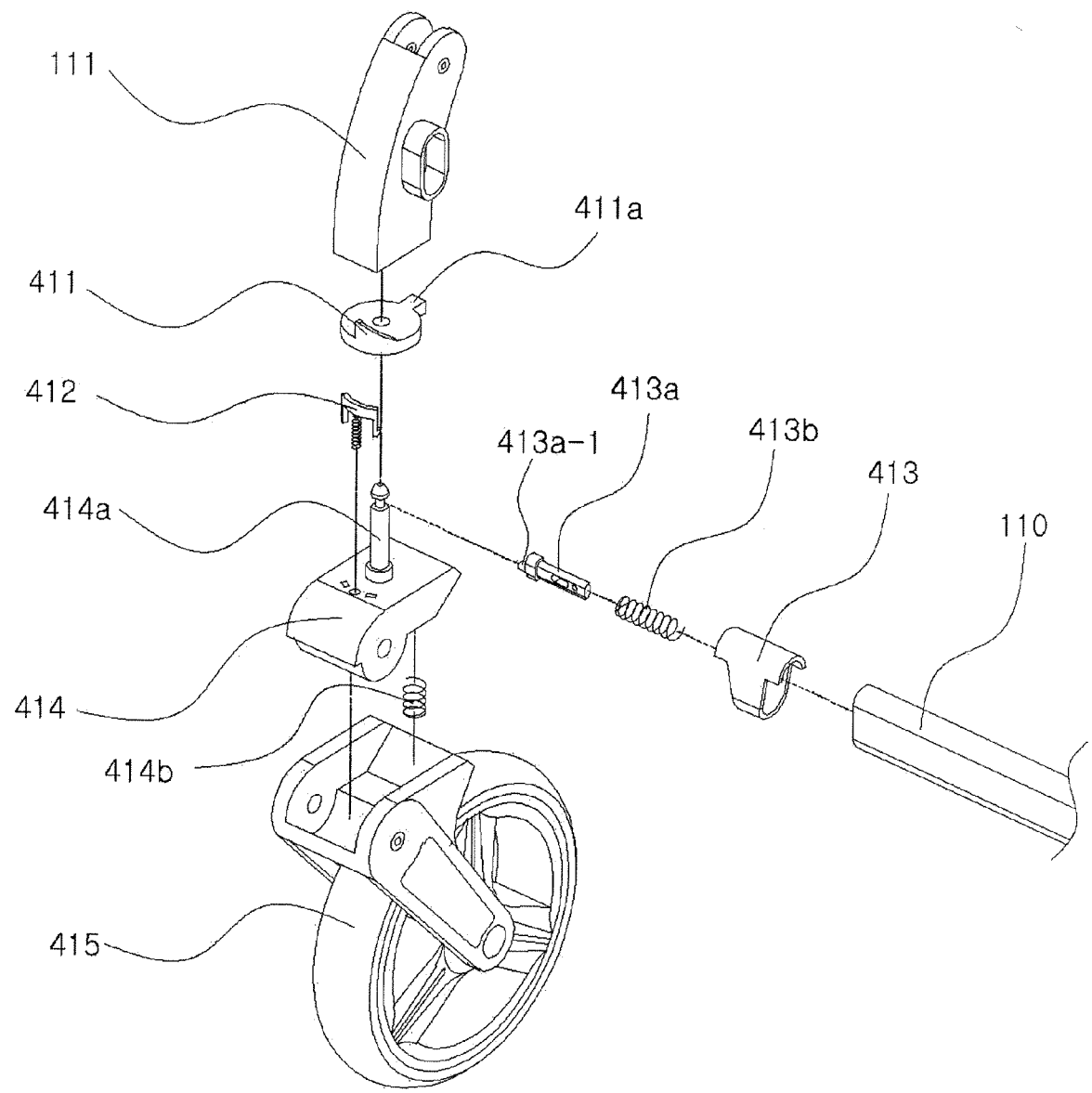
FIG. 9 is an exploded perspective view showing the structural elements of the front wheel drive assembly according to the present invention.
Figure 10:
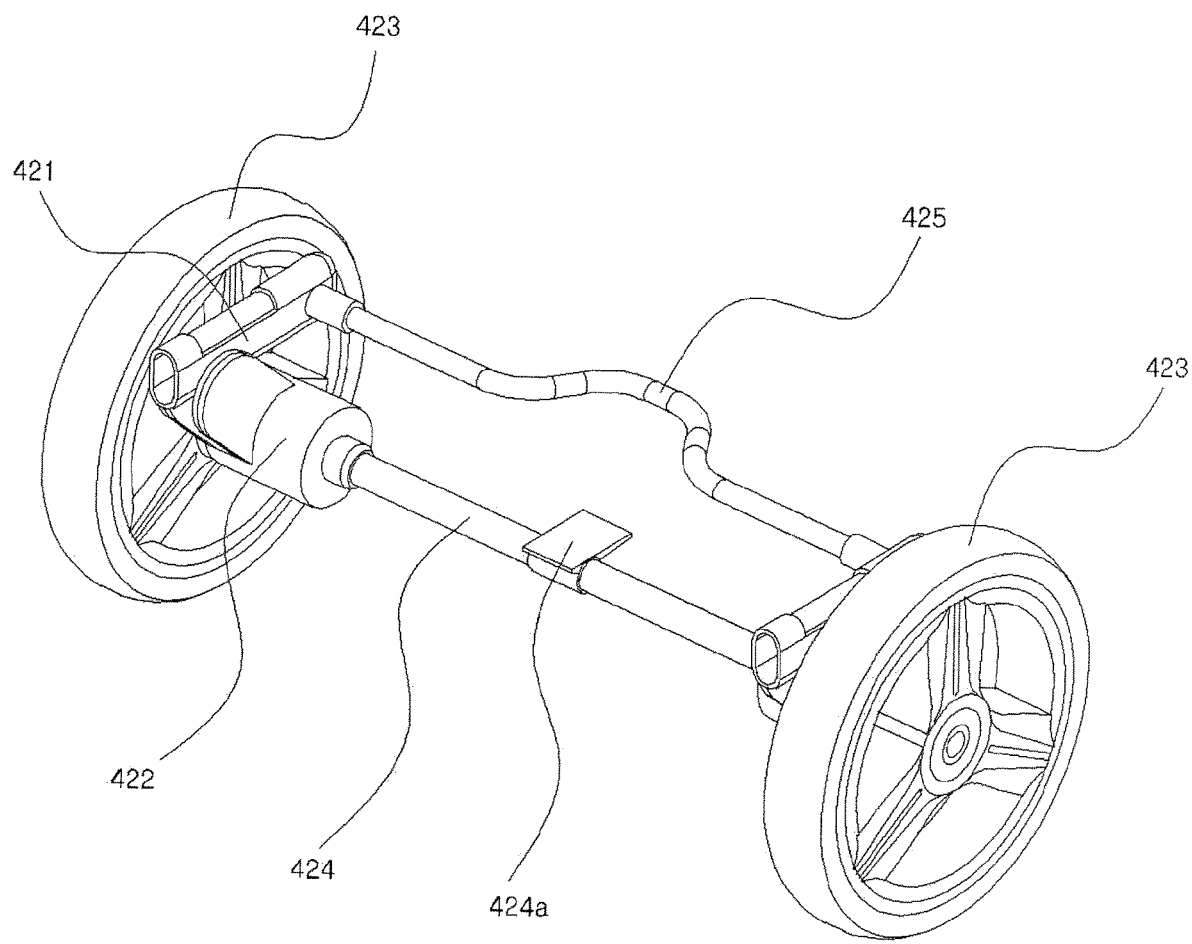
FIG. 10 is a perspective view showing the overall shape and the structural elements of the rear wheel drive assembly according to the present invention.
Figure 11:
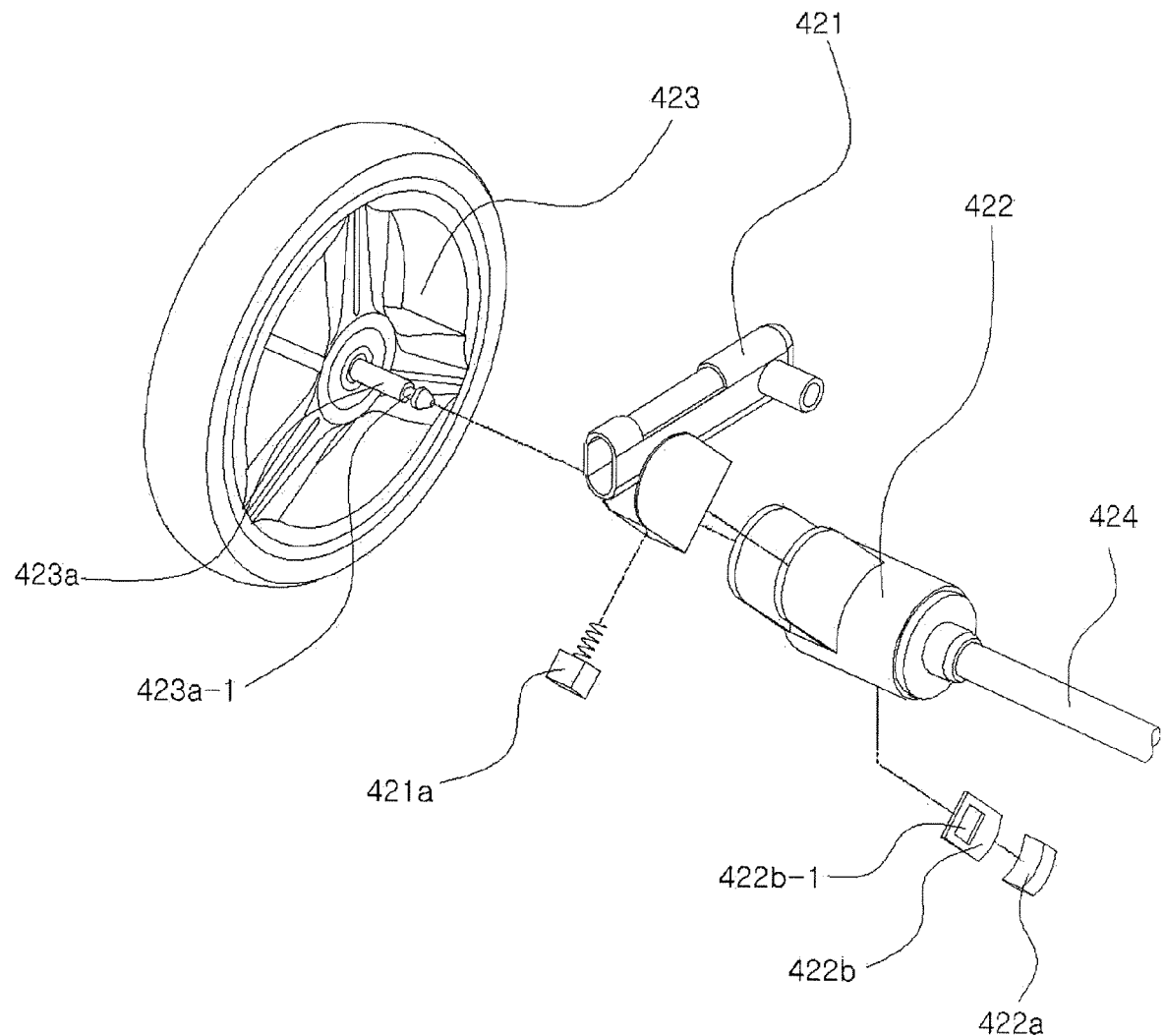
FIG. 11 is an exploded perspective view showing the structural elements of the rear wheel drive assembly according to the present invention.
Figure 12:
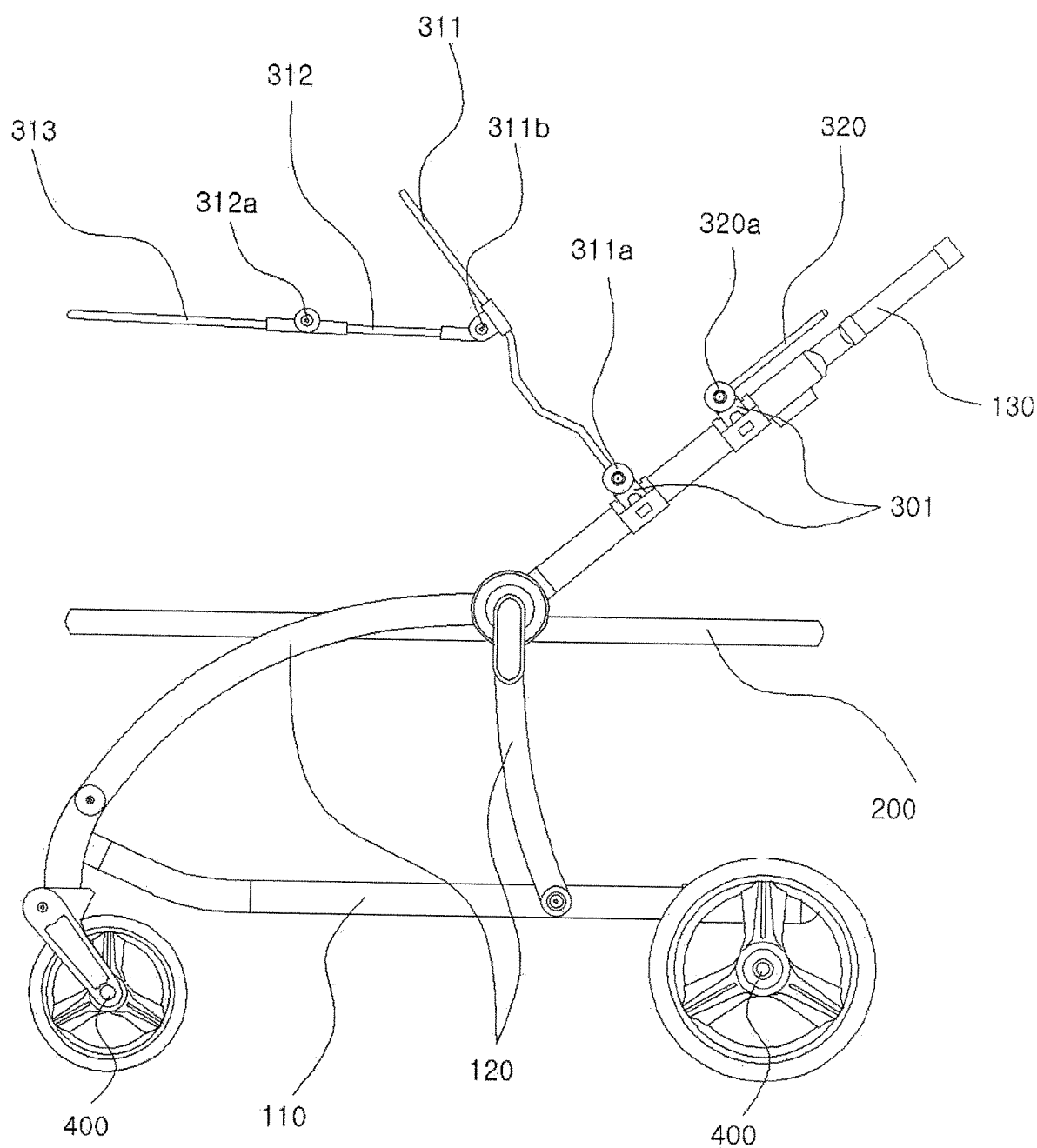
FIG. 12 is a side view showing the overall shape of the wagon having improved convenience of use according to the present invention.

As shown in FIG. 5, the coupling pin movement hole 123b-1 includes an arc-shaped recess formed around the central axis of the coupling pin rotation guide plate and a straight recess formed at the rear end of the arc-shaped recess so as to extend toward the central axis of the coupling pin rotation guide plate.

A protruding pin 123d-1 of the coupling pin frame is received in the coupling pin movement hole such that the movement path of the protruding pin is defined. When the protruding pin is inserted into the straight recess, rotation of the rotary shaft housing is prevented. When the protruding pin moves into the arc-shaped recess, the rotary shaft housing is rotated along the movement path of the protruding pin.

The front part of the coupling pin movement guide plate 123c is formed in a round shape, and the rear part of the coupling pin movement guide plate is formed in a rectangular shape. The coupling pin movement guide plate is inserted into the coupling pin support frame. The coupling pin movement guide plate is provided in one side of the middle thereof with a coupling pin guide hole 123c-1, which is a longitudinal hole, in a longitudinal direction.

As shown in FIG. 5, the coupling pin guide hole 123c-1 is formed so as to coincide with the straight recess of the coupling pin movement hole in order to guide forward-rearward movement of the protruding pin 123d-1.

The coupling pin frame 123d is a rectangular frame having a protruding pin 123d-1 protruding therefrom in the leftward-rightward direction. The coupling pin frame is connected to a wire so as to be moved upwards and downwards in the longitudinal direction and to be rotated.

The protruding pin 123d-1 according to the present invention extends through the coupling pin movement hole 123b-1 and the coupling pin guide hole 123c-1 in an outward direction, and extends through a coupling pin frame insertion recess 123e-1 and a coupling pin movement hole 123f-1 in an inward direction.

The coupling pin frame is connected to a foldable rotary button 132 via the wire connected to the upper end thereof so as to be moved upwards and downwards.

When the foldable rotary button 132 is pushed, the foldable rotary button is moved upwards, and the protruding pin is moved into the coupling pin movement hole 123f-1 coupled thereto in the inward direction and into the arc-shaped recess of the coupling pin movement hole 123b-1 coupled thereto in the outward direction, whereby the rotary shaft housing 123a is rotated along the movement path thereof. When the foldable rotary button 132 is returned to the original position thereof, the protruding pin is moved into the coupling pin movement hole 123f-1 coupled thereto in the inward direction and into the straight recess of the coupling pin movement hole 123b-1 coupled thereto in the outward direction, whereby the rotary shaft housing 123a is fixed so as not to be rotated.

The front part of the coupling pin support frame 123e is formed in a cylindrical shape that is erected laterally. The front part of the coupling pin support frame is received in the rotary shaft housing. The rear part of the coupling pin support frame is a rectangular frame. The coupling pin support frame is provided in one side of the inside thereof with a coupling pin frame insertion recess 123e-1, which is a longitudinal hole, in the longitudinal direction. The coupling pin support frame is provided in one side of the middle of the lower end thereof with a fixing pin insertion hole 123e-2, into which a fixing pin 123f-2 can be inserted.

The coupling pin support frame 123e is provided in the inner surface thereof with a sliding recess extending in a longitudinal direction of the handle frame such that the coupling pin frame 123d moving along the coupling pin frame insertion recess 123e-1 is smoothly movable in a longitudinal direction.

The handle frame 130 is coupled to one side of the rear surface of the upper end of the coupling pin support frame 123e according to the present invention in a fixed state.

The fixed shaft housing 123f is an inner frame of the cylindrical structure that is erected laterally. The fixed shaft housing is provided with a coupling pin movement hole 123f-1 configured to guide fixation and rotation of the coupling pin. The fixed shaft housing is provided at one side of the middle of the lower end thereof corresponding to the position of the fixing pin insertion hole 123e-2 with a fixing pin 123f-2.

The fixing pin 123f-2 is detachably coupled to the fixing pin insertion hole 123e-2 in order to auxiliarily support rotation and fixation of the rotary shaft housing.

When the foldable rotary button 132 is pushed, the fixing pin is separated from the fixing pin insertion hole such that the coupling pin support frame 123e is moved in the outward direction and is thus rotated. When the foldable rotary button 132 is returned to the original position thereof, the fixing pin is inserted into the fixing pin insertion hole such that the coupling pin support frame 123e is moved in the inward direction and is thus fixed so as not to be rotated.

As a result, rotation and fixation of the rotary shaft housing based on the movement of the protruding pin 123d-1 are auxiliarily supported, whereby stable rotation and fixation of the rotary shaft frame are achieved.

A corresponding one of the first side frames 121 is coupled to one side of the front of the lower end of the fixed shaft housing 123f according to the present invention in a fixed state.

The handle frame 130 is a "["-shaped frame inserted into a hollow outer frame so as to be fixed in the state in which the length thereof is variable. The rotary shaft frames of the side support frame are coupled to the left and right lower ends of the handle frame.

The handle frame includes canopy coupling brackets 131, foldable rotary buttons 132, and a handle length adjustment button 133.

The canopy coupling brackets 131 are two brackets formed around one side of the middle of the hollow outer frame so as to be spaced apart from each other in left-right symmetry. Each of the canopy coupling brackets is provided in the upper end surface of an outer protruding part thereof with a coupling pin insertion recess 131a, into which the coupling pin is inserted. A protrusion recess 131b configured to receive a coupling pin protrusion is formed in the outer surface of the canopy coupling bracket under the coupling pin insertion recess in the vertical direction.

A coupling pin formed at the lower end of a canopy detachment portion is inserted into the coupling pin insertion recess 131a, and a detachment protrusion 301b is inserted into the protrusion recess 131b formed in the outer surface of the canopy coupling bracket, whereby the canopy frame is coupled to the canopy coupling brackets.

The foldable rotary buttons 132 are formed at one side of the lower end of the upper part of the hollow outer frame in left-right symmetry. When the foldable rotary buttons are pushed, the entirety of the main frame is folded.

Each of the foldable rotary buttons 132 according to the present invention is connected to the coupling pin frame 123d via the wire formed at the rear thereof in order to move the coupling pin frame upwards and downwards in the longitudinal direction.

Specifically, when the foldable rotary button 132 is pushed, as shown in FIG. 14, the wire is pulled, whereby the coupling pin frame 123d is moved upwards and the protruding pin 123d-1 formed at the left and right sides of the coupling pin frame is moved along the arc-shaped recess, and therefore the handle frame coupled to the rotary shaft housing is rotated forwards. When the foldable rotary button 132 is released such that the foldable rotary button is returned to the original position thereof, the pulled wire is released, whereby the coupling pin frame 123d is moved downwards and the protruding pin 123d-1 formed at the left and right sides of the coupling pin frame is moved toward the central axis thereof along the straight recess, and therefore the handle frame is fixed so as not to be rotated.

At this time, when the rotary shaft housing is rotated, as shown in FIG. 15, the upper end of the second outer frame 122a and the lower end of the second inner frame 122b are rotated rearwards and downwards. As a result, the first side frame is rotated downwards, the side support frame 120 is folded downwards, and the seat frame coupled to the inside of the rotary shaft frame is folded downwards.

As described above, it is possible to easily fold or unfold the main frame and the seat frame through a one-touch pushing operation, whereby portability and mobility of the infant wagon 1 are improved. In addition, it is possible to easily fold and unfold the overall frame, whereby it is possible for everyone to easily install and store the infant wagon and to conveniently use the infant wagon.

The handle length adjustment button 133 is formed at the middle of the rear of the handle frame so as to protrude inwards.

The handle length adjustment button 133 according to the present invention serves to vary the length of the handle frame 130 while moving and fixing a length adjustment handle frame 130b inserted into the hollow outer frame 130a in the longitudinal direction.

When the handle length adjustment button 133 is pushed, the length adjustment handle frame 130b may be moved in the longitudinal direction. When the handle length adjustment button 133 is released, the handle length adjustment button is returned to the original position thereof by an elastic spring formed therein, whereby the length adjustment handle frame 130b is fixed so as not to be moved in the longitudinal direction.

Next, the seat frame 200 according to the present invention will be described.

The seat frame 200 is a rectangular frame coupled to one side of the inner upper end of the main frame in the leftward-rightward direction. The seat frame serves to support a wagon seat 201.

The wagon seat 201 is a rectangular seat coupled along the circumference of the lower end of the seat frame. The inner lower end of the wagon seat is closed and is supported by the upper end of the bottom support frame. A first zipper 202a is formed at the middle front of the inner lower end of the wagon seat so as to extend in a leftward-rightward horizontal direction. A second zipper 202b is formed at the middle rear of the inner lower end of the wagon seat so as to extend in the leftward-rightward horizontal direction. A third zipper 202c is formed at the middle of the outer lower end of the wagon seat so as to extend in the leftward-rightward horizontal direction.

The first zipper 202a includes a first front zipper 202a-1 formed at the middle front of the inner lower end of the wagon seat and a first rear zipper 202a-2 formed at the inner front edge of a seat leg support recess 202. When the first zipper is opened, the folded front surface of the seat leg support recess 202 may be spread downwards. When the first zipper is closed, the front surface of the seat leg support recess 202 may be stably folded and fixed.

The second zipper 202b includes a second rear zipper 200b-1 formed at the middle rear of the inner lower end of the wagon seat and a second front zipper 202b-2 formed at the inner rear edge of the seat leg support recess 202. When the second zipper is opened, the folded rear surface of the seat leg support recess 202 may be spread downwards. When the second zipper is closed, the rear surface of the seat leg support recess 202 may be stably folded and fixed.

The third zipper 202c includes a third front zipper 202c-1 formed at the outer front of the middle portion between the first front zipper and the first rear zipper in the vertical direction and a third rear zipper 202c-2 formed at the outer rear of the middle portion between the second rear zipper and the second front zipper in the vertical direction. When the third zipper is closed, the front height portion and the rear height portion of the seat leg support recess folded at the front and the rear thereof, respectively, are zipper-coupled while facing each other, whereby the inner lower end surface of the wagon seat 201 is flat. When the first zipper and the second zipper are opened after the third zipper is opened, the seat leg support recess 202 may be formed in the middle of the inner lower end of the wagon seat 201.

When the first zipper 202a and the second zipper 202b are opened after the third zipper 202c is opened, as described above, the seat leg support recess 202 is formed in the middle of the inner lower end of the wagon seat 201, whereby the interior of the infant wagon is formed in the shape of a chair such that a child in the infant wagon can sit on the chair. When the first zipper 202a and the second zipper 202b are closed, the inner lower end of the wagon seat 201 is flat such that the child can lie down.

As described above, the inner shape of the wagon seat may be variable depending on purpose and situation, whereby it is possible to improve riding comfort of the child in the infant wagon and to minimize inconvenience of the child based on the posture thereof.

In addition, a basket frame 210 is coupled to one inner side of the rear of the seat frame 200 according to the present invention so as to be axially rotatable. A rectangular tray 220 is detachably coupled to the one side of the middle of the seat frame.

The basket frame 210 is axially coupled to the inner side of the rear of the seat frame 200 in a symmetrical fashion. When the basket frame is rotated upwards, the basket frame is rotated inwardly of the seat frame, and therefore the volume of the basket frame is reduced.

Insertion wings 221 are formed at the left and right fronts and the left and right rears of a rectangular tray frame of the tray 220 so as to be inserted downwards. A protrusion insertion recess 221a is formed in the middle of the outer surface of each of the insertion wings.

When insertion protrusions 200a formed at the left and right outer surfaces of the middle of the seat frame are inserted into the protrusion insertion recesses 221a of the left and right insertion wings, the insertion wings 221 are prevented from moving along the seat frame coupled therewith in the forward-rearward direction, and therefore the insertion wings are stably fixed.

When the tray is coupled as described above, it is possible for the child in the infant wagon 1 to eat a snack or to take a drink using the tray. When the tray is detached, it is possible to improve space utilization for the child in the infant wagon 1.

The seat frame 200 according to the present invention is coupled to the insides of the rotary shaft frames. In the infant wagon use mode, in which the rotary shaft frames are moved upwards, the seat frame is horizontally moved upwards to vertically support the wagon seat while defining a space therein. In the infant wagon folding mode, in which the rotary shaft frames are moved downwards, the seat frame is horizontally moved downwards such that the wagon seat is folded, whereby the volume of the wagon seat in the vertical direction is minimized.

Next, the canopy frame 300 according to the present invention will be described.

In the canopy frame 300, a plurality of "["-shaped frames is rotated upwards and downwards about a plurality of rotary shafts formed in left-right symmetry to open and close the upper end of the infant wagon.

The canopy frame includes a front canopy frame 310 and a rear canopy frame 320.

The front canopy frame 310 includes: a first canopy frame 311, which is a "["-shaped frame, the first canopy frame being provided at the left and right lower ends thereof with first rotary portions 311a configured to be axially coupled to canopy detachment portions 301, trapezoidal bent portions being formed at the middles of the opposite sides of the first canopy frame, second rotary portions 311b being coupled to the upper ends of the bent portions in a symmetrical fashion; a second canopy frame 312, which is a straight frame, rear ends of the second canopy frame being axially coupled to the second rotary portions 311b, front ends of the second canopy frame being axially coupled to third rotary portions 312 so as to be rotatable; and a third canopy frame 313, which is a "["-shaped frame, the left and right rear ends of the third canopy frame being coupled to the third rotary portions 312 so as to be rotatable.

Figure 13:
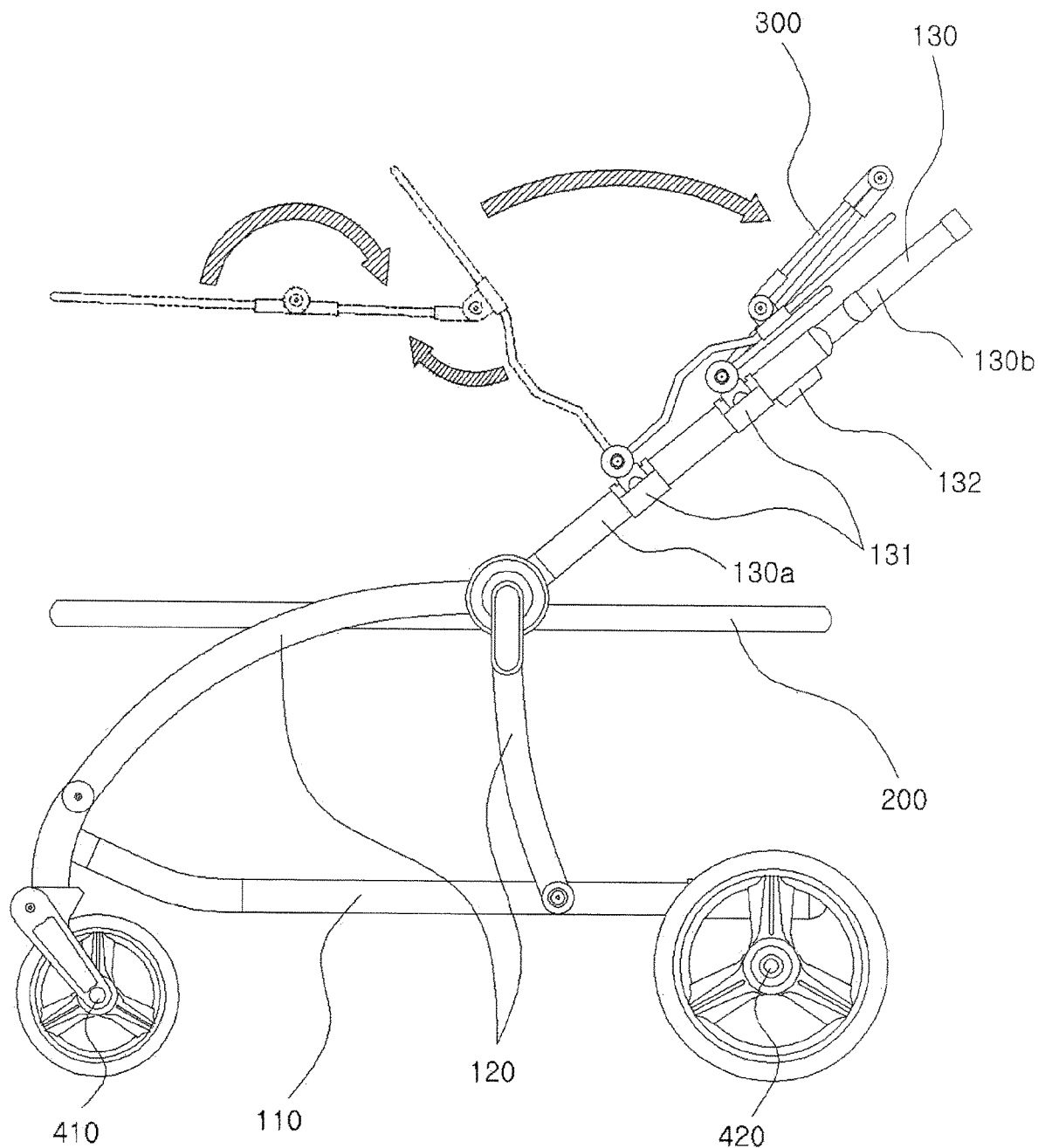
FIG. 13 is a side view showing an embodiment in which a canopy frame according to the present invention is rotated stepwise about a plurality of rotary assemblies.

When the third canopy frame 313 located at the front is pulled rearwards and upwards while being rotated, as shown in FIG. 13, the second canopy frame and the first canopy frame are sequentially rotated and folded, whereby the front canopy frame 310 according to the present invention is folded toward the handle frame and is thus brought into tight contact with the handle frame.

As described above, the front canopy frame is rotated by one touch so as to switch between the use mode and the folding mode, whereby it is possible to conveniently install or fold the canopy within a short time.

In addition, the front canopy frame is folded so as to be brought into tight contact with the handle frame. Consequently, it is possible to easily store the infant wagon 1 without detachment of the canopy frame 300, whereby it is possible to rapidly switch between the infant wagon installation mode and the infant wagon storage mode.

A zipper may be formed in canopy cloth formed along the circumference of the upper end of the first canopy frame in order to separate and couple a canopy portion corresponding to the front part of the first canopy frame and a canopy portion corresponding to the rear part of the first canopy frame from and to each other using the zipper.

Specifically, a canopy cloth portion corresponding to the front part of the canopy frame and a canopy cloth portion corresponding to the rear part of the canopy frame are separately provided so as to be detachably coupled to each other, whereby it is possible to easily wash the canopy cloth.

The rear canopy frame 320 is a "["-shaped frame. The rear canopy frame is provided at the left and right lower ends thereof with fourth rotary portions 320a configured to be axially coupled to the canopy detachment portions 301.

As a result, it is possible to rotate the end of the canopy frame unfolded rearwards, whereby it is possible for a caregiver to observe and take care of the infant in the infant wagon at any time.

Next, the wheel assembly 400 according to the present invention will be described.

The wheel assembly 400 includes front wheel driving assemblies 410 coupled to the left and right sides of the front lower end of the main frame in a symmetrical fashion and a rear wheel driving assembly 420 coupled to the left and right sides of the rear of the main frame. The wheel assembly serves to drive the infant wagon while supporting the infant wagon.

Each of the front wheel driving assemblies 410 includes a front wheel rotation control frame 411, a front wheel rotation fixing pin 412, a front wheel detachment frame 413, a front wheel shock absorption frame 414, and a front wheel 415.

The front wheel rotation control frame 411 is inserted into the lower end of a corresponding of the front wheel coupling portions formed at the left and right sides of the front lower ends of the main frame in a symmetrical fashion. One side of the front of the front wheel rotation control frame protrudes along an inclined surface so as to have a right triangular structure. The front wheel rotation control frame serves to detach the front wheel rotation fixing pin located at the lower end thereof while being moved upwards and downwards in response to rotation of a rear end switch.

The front wheel rotation fixing pin 412 is located at the lower end of the front wheel rotation control frame, and has an arc-shaped plane. Detachment pins protrude from the left and right sides of the front wheel rotation fixing pin. An elastic spring is coupled perpendicularly to the middle of the lower end of the front wheel rotation fixing pin.

The front wheel detachment frame 413 is fitted onto a corresponding one of left and right outer circumferences of a horizontal frame located at the front lower end of the main frame. A detachment spring coupled to a front wheel detachment bar is mounted in the front wheel detachment frame such that the front wheel detachment frame is movable leftwards and rightwards.

A vertically erected front wheel detachment rod is formed at the middle of the upper end of the front wheel shock absorption frame 414. The front wheel shock absorption frame is inserted into a frame upper end recess of the front wheel so as to be axially coupled at the front left and right sides thereof. An elastic spring is provided at one side of the rear lower end of the front wheel shock absorption frame.

The front wheel 415 is coupled to the lower end of a corresponding one of the front wheel coupling portions 111 formed at the left and right sides of the front lower end of the main frame in a symmetrical fashion. The front wheel serves to support the front lower end of the infant wagon, and also serves to provide power necessary to move the front of the wagon through rotation.

The rear wheel driving assembly 420 includes rear wheel coupling brackets 421, rear wheel support frames 422, rear wheels 423, a brake rotary shaft 424, and a rear wheel support frame 425.

The rear wheel coupling brackets 421 are coupled to the left and right sides of the rear lower end of the main frame in a symmetrical fashion. A rearward inclined bracket is formed at one side of the lower end of each of the wheel coupling brackets. A shock elimination elastic portion 421a is received in the inclined bracket.

Each of the rear wheel support frames 422 is a cylindrical frame that is erected in a lateral direction. A forward inclined bracket formed at one side of the upper end of each of the rear wheel support frames is axially coupled to a corresponding one of the rear wheel coupling brackets. A rear wheel detachment rod 423a of a corresponding one of the rear wheels is inserted into and coupled to a central recess of the outer surface of the rear wheel support frame. A push type rear wheel detachment button protrudes from one side of the rear lower end of the rear wheel support frame. The brake rotary shaft 424 is coupled to the center of the inside of the rear wheel support frame.

The rear wheel detachment rod 423a protruding from the center of the inside of each of the rear wheels 423 is coupled to the center of the outside of a corresponding one of the rear wheel support frames. The rear wheels serve to support the rear lower end of the infant wagon, and also serve to provide power necessary to move the rear of the wagon through rotation.

The brake rotary shaft 424 is a circular rod-shaped frame. The brake rotary shaft is coupled to the centers of the insides of the rear wheel support frames 422 in the leftward-rightward direction. A brake pad 424a is formed at the middle of the brake rotary shaft in order to control rotation of the rear wheels.

The rear wheel support frame 425 is coupled to the rear insides of the rear wheel coupling brackets in the leftward-rightward direction in order to support left and right coupling of the rear wheel driving assembly.

Hereinafter, the operation of the wagon having improved convenience of use according to the present invention will be described in detail.

First, the handle frame, which is stored in the folded state and laid in the state of being in tight contact with the bottom support frame, is lifted rearwards and upwards.

At this time, the first side frames and the second side frames, which are laid, are erected, the rotary shaft frames are moved upwards, and the seat frame coupled to the insides of the rotary shaft frames is moved upwards and is then horizontally fixed.

Subsequently, when the third canopy frame of the canopy frame, which is folded in the state of being in tight contact with the handle frame, is rotated forwards, the first canopy frame and the second canopy frame are unfolded, whereby the canopy frame is unfolded forwards.

Subsequently, the basket frame, which is located at the rear of the seat frame, is rotated rearwards and installed. As a result, the infant wagon is used in an unfolded state.

After use, the infant wagon is stored as follows. The first canopy frame located at the front of the canopy frame is rotated rearwards. As a result, the second canopy frame and the third canopy frame are folded and brought into tight contact with the handle frame.

Subsequently, the basket frame is rotated inwardly of the seat frame so as to be folded.

Finally, the handle frame is rotated forwards about the rotary shaft frames in the state in which the foldable rotary buttons located at the rear lower ends of the handle frame are pushed. As a result, the first side frames and the second side frames are rotated downwards, and the rotary shaft frames are moved downwards, whereby the seat frame is rotated and folded so as to be brought into tight contact with the bottom support frame.

In the case in which a storage space is small, the front wheels and the rear wheels may be detached from the wagon and may then be separately stored.

INDUSTRIAL APPLICABILITY

The present invention provides a wagon having improved convenience of use, wherein the wagon includes a main frame, a seat frame, a canopy frame, and a wheel assembly, wherein a foldable structure of each frame is conveniently manufactured such that the wagon can be unfolded and folded within a short time when the wagon in a stored state is installed, whereby portability and mobility of the wagon are improved, wherein the overall frame is easily folded and unfolded, whereby it is possible to conveniently use the wagon, wherein attachment and detachment of the canopy and the driving wheels are easy, whereby carrying and storage of the wagon are easy, and wherein the wagon is easily folded and unfolded without separation of the seat frame and the canopy, whereby it is possible for everyone to easily install and store the wagon. Consequently, the present invention has industrial applicability.

The invention claimed is:

1. An infant wagon comprising:
 a main frame configured to have a structure in which each side of the main frame is formed in a "^" shape to completely support a main body of the wagon and the main frame is configured to be folded or unfolded at intersection portions thereof through hinge structures such that a form of the main frame is variable, the main frame comprising:
 a bottom support frame, which is a trapezoidal frame which is laid horizontally and a front side of which is curved upwards, front wheel coupling portions being formed at left and right front ends of the bottom support frame, rotary coupling shafts being formed at middles of left and right sides of the bottom support frame so as to be axially coupled to a side support frame;

the side support frame, which is formed in left-right symmetry and each side of which is formed in the "^" shape, front and rear lower ends of the side support frame being axially coupled to the bottom support frame via the rotary coupling shafts, wherein rotary shaft frames, disposed at the intersection portions located at an upper end of the side support frame, have the hinge structures in order to support sides of a wagon frame; and a handle frame, which is a "["-shaped frame inserted into a hollow outer frame so as to be fixed in a state in which a length thereof is variable, the rotary shaft frames of the side support frame being coupled to left and right lower ends of the handle frame, the side support frame comprising:

first side frames, each of which is a curved frame located at a front of the "^" shaped side support frame, front lower ends of the first side frames being coupled to upper end rotary shafts of the front wheel coupling portions of the bottom support frame, rear upper ends of the first side frames being coupled to fixed shaft housings of the rotary shaft frames;

second side frames, each of which is a curved frame having a dual structure located at a rear of the "^" shaped side support frame, lower ends of the second side frames being coupled to the rotary coupling shafts of the bottom support frame, each of the second side frames comprising a second outer frame, a middle of which is coupled to a second inner frame via a first hinge, a lower end of the second inner frame is coupled to an inner middle of the second outer frame via the first hinge and an upper end of the second inner frame is coupled to a corresponding one of rotary shaft housings of the rotary shaft frames; and the rotary shaft frames, each of which is a frame having a double cylindrical structure that is erected laterally, each of the rotary shaft frames being formed at a position at which an upper end of a corresponding one of the first side frames and an upper end of a corresponding one of the second side frames intersect each other, the rotary shaft frame configured to be rotated through a second hinge, the rotary shaft frames being coupled to a seat frame inwards in order to fix the seat frame;

the seat frame, which is a rectangular frame coupled to one side of an inner upper end of the main frame in a leftward-rightward direction, the seat frame being configured to support a wagon seat;

a canopy frame comprising a plurality of "["-shaped frames configured to be rotated upwards and downwards about a plurality of rotary shafts formed in left-right symmetry in order to open and close an upper end of the infant wagon; and a wheel assembly comprising front wheel driving assemblies coupled to left and right sides of a front lower end of the main frame in a symmetrical fashion and a rear wheel driving assembly coupled to left and right sides of a rear of the main frame, the wheel assembly being configured to drive the infant wagon while supporting the infant wagon, wherein each of the rotary shaft frames comprises:

the rotary shaft housing, which is an outer frame of the cylindrical structure that is erected laterally, an inner surface of the rotary shaft housing being axially coupled to the fixed shaft housing so as to be rotated in an upward-downward direction;

a coupling pin rotation guide plate, which is a pie-shaped plate empty at one side thereof, including a coupling pin movement hole configured to guide fixation and rotation of a coupling pin;

a coupling pin movement guide plate, a front part of which is formed in a round shape and a rear part of which is formed in a rectangular shape, the coupling pin movement guide plate being inserted into a coupling pin support frame, the coupling pin movement guide plate being provided in one side of a middle thereof with a coupling pin guide hole, which is a longitudinal hole, in a longitudinal direction;

a coupling pin frame, which is a rectangular frame having a protruding pin protruding therefrom in the leftward-rightward direction, the coupling pin frame being connected to a wire so as to be moved upwards and downwards in the longitudinal direction and to be rotated;

a coupling pin support frame, a front part of which is formed in a cylindrical shape that is erected laterally, a front part of the coupling pin support frame being received in the rotary shaft housing, a rear part of the coupling pin support frame being a rectangular frame, the coupling pin support frame being provided in one side of an inside thereof with a coupling pin frame insertion recess, which is a longitudinal hole, in the longitudinal direction; and the fixed shaft housing, which is an inner frame of the cylindrical structure that is erected laterally, an outer surface of the fixed shaft housing being axially coupled to the rotary shaft housing in order to support axial rotation of the rotary shaft housing.

2. The wagon according to claim 1, wherein a basket frame is axially coupled to an inner side of a rear of the seat frame so as to be rotated in an axial direction, and a tray is detachably coupled to a middle of the seat frame, insertion wings being formed at left and right fronts and left and right rears of a rectangular tray frame of the tray so as to be inserted downwards, a protrusion insertion recess being formed in a middle of an outer surface of each of the insertion wings.

3. The wagon according to claim 1, wherein the wagon seat is a rectangular seat coupled along a circumference of a lower end of the seat frame, an inner lower end of the wagon seat being closed and being supported by an upper end of the bottom support frame, a first zipper being formed at a middle front of an inner lower end of the wagon seat so as to extend in a leftward-rightward horizontal direction, a second zipper being formed at a middle rear of the inner lower end of the wagon seat so as to extend in the leftward-rightward horizontal direction, a third zipper being formed at a middle of an outer lower end of the wagon seat so as to extend in the leftward-rightward horizontal direction, a seat leg support recess being formed in a middle of an inner lower end of the wagon seat as a result of opening of the first zipper, the second zipper, and the third zipper.

4. An infant wagon comprising:

a main frame configured to have a structure in which each side of the main frame is formed in a "^" shape to completely support a main body of the wagon and the main frame is configured to be folded or unfolded at intersection portions thereof through hinge structures such that a form of the main frame is variable, the main frame comprising:

a bottom support frame, which is a trapezoidal frame which is laid horizontally and a front side of which is curved upwards, front wheel coupling portions being formed at left and right front ends of the bottom support frame, rotary coupling shafts being formed at middles of left and right sides of the bottom support frame so as to be axially coupled to a side support frame;

the side support frame, which is formed in left-right symmetry and each side of which is formed in the "^" shape, front and rear lower ends of the side support frame being axially coupled to the bottom support frame via the rotary coupling shafts, wherein rotary shaft frames, disposed at the intersection portions located at an upper end of the side support frame, have the hinge structures in order to support sides of a wagon frame; and a handle frame, which is a "["-shaped frame inserted into a hollow outer frame so as to be fixed in a state in which a length thereof is variable, the rotary shaft frames of the side support frame being coupled to left and right lower ends of the handle frame, the side support frame comprising:

first side frames, each of which is a curved frame located at a front of the "^" shaped side support frame, front lower ends of the first side frames being coupled to upper end rotary shafts of the front wheel coupling portions of the bottom support frame, rear upper ends of the first side frames being coupled to fixed shaft housings of the rotary shaft frames;

second side frames, each of which is a curved frame having a dual structure located at a rear of the "^" shaped side support frame, lower ends of the second side frames being coupled to the rotary coupling shafts of the bottom support frame, each of the second side frames comprising a second outer frame, a middle of which is coupled to a second inner frame via a first hinge, a lower end of the second inner frame is coupled to an inner middle of the second outer frame via the first hinge and an upper end of the second inner frame is coupled to a corresponding one of rotary shaft housings of the rotary shaft frames; and the rotary shaft frames, each of which is a frame having a double cylindrical structure that is erected laterally, each of the rotary shaft frames being formed at a position at which an upper end of a corresponding one of the first side frames and an upper end of a corresponding one of the second side frames intersect each other, the rotary shaft frame configured to be rotated through a second hinge, the rotary shaft frames being coupled to a seat frame inwards in order to fix the seat frame;

the seat frame, which is a rectangular frame coupled to one side of an inner upper end of the main frame in a leftward-rightward direction, the seat frame being configured to support a wagon seat;

a canopy frame comprising a plurality of "["-shaped frames configured to be rotated upwards and downwards about a plurality of rotary shafts formed in left-right symmetry in order to open and close an upper end of the infant wagon; and a wheel assembly comprising front wheel driving assemblies coupled to left and right sides of a front lower end of the main frame in a symmetrical fashion and a rear wheel driving assembly coupled to left and right sides of a rear of the main frame, the wheel assembly being configured to drive the infant wagon while supporting the infant wagon, each of the rotary shaft frames comprising:

the rotary shaft housing, which is an outer frame of the cylindrical structure that is erected laterally, an inner surface of the rotary shaft housing being axially coupled to the fixed shaft housing so as to be rotated in an upward-downward direction;

a coupling pin rotation guide plate, which is a pie-shaped plate empty at one side thereof, including a coupling pin movement hole configured to guide fixation and rotation of a coupling pin;

a coupling pin movement guide plate, a front part of which is formed in a round shape and a rear part of which is formed in a rectangular shape, the coupling pin movement guide plate being inserted into a coupling pin support frame, the coupling pin movement guide plate being provided in one side of a middle thereof with a coupling pin guide hole, which is a longitudinal hole, in a longitudinal direction;

a coupling pin frame, which is a rectangular frame having a protruding pin protruding therefrom in the leftward-rightward direction, the coupling pin frame being connected to a wire so as to be moved upwards and downwards in the longitudinal direction and to be rotated;

a coupling pin support frame, a front part of which is formed in a cylindrical shape that is erected laterally, a front part of the coupling pin support frame being received in the rotary shaft housing, a rear part of the coupling pin support frame being a rectangular frame, the coupling pin support frame being provided in one side of an inside thereof with a coupling pin frame insertion recess, which is a longitudinal hole, in the longitudinal direction; and the fixed shaft housing, which is an inner frame of the cylindrical structure that is erected laterally, an outer surface of the fixed shaft housing being axially coupled to the rotary shaft housing in order to support axial rotation of the rotary shaft housing, wherein a basket frame is axially coupled to an inner side of a rear of the seat frame so as to be rotated in an axial direction, and a tray is detachably coupled to a middle of the seat frame, insertion wings being formed at left and right fronts and left and right rears of a rectangular tray frame of the tray so as to be inserted downwards, a protrusion insertion recess being formed in a middle of an outer surface of each of the insertion wings, and wherein the wagon seat is a rectangular seat coupled along a circumference of a lower end of the seat frame, an inner lower end of the wagon seat being closed and being supported by an upper end of the bottom support frame, a first zipper being formed at a middle front of an inner lower end of the wagon seat so as to extend in a leftward-rightward horizontal direction, a second zipper being formed at a middle rear of the inner lower end of the wagon seat so as to extend in the leftward-rightward horizontal direction, a third zipper being formed at a middle of an outer lower end of the wagon seat so as to extend in the leftward-rightward horizontal direction, a seat leg support recess being formed in a middle of an inner lower end of the wagon seat as a result of opening of the first zipper, the second zipper, and the third zipper.

* * * * *